United States Patent
Larsson et al.

(10) Patent No.: US 7,336,930 B2
(45) Date of Patent: Feb. 26, 2008

(54) INTERFERENCE CANCELLATION IN WIRELESS RELAYING NETWORKS

(75) Inventors: Peter Larsson, Solna (SE); Niklas Johansson, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 10/549,908

(22) PCT Filed: Apr. 26, 2004

(86) PCT No.: PCT/SE2004/000633

§ 371 (c)(1),
(2), (4) Date: Sep. 20, 2005

(87) PCT Pub. No.: WO2004/102891

PCT Pub. Date: Nov. 25, 2004

(65) Prior Publication Data

US 2006/0229017 A1 Oct. 12, 2006

Related U.S. Application Data

(60) Provisional application No. 60/470,425, filed on May 15, 2003.

(51) Int. Cl.
*H04B 1/00* (2006.01)
*H04B 15/00* (2006.01)
(52) U.S. Cl. ............... 455/63.1; 455/13.1; 455/24; 455/67.13
(58) Field of Classification Search ............... 455/13.1, 455/24, 63.1, 67.1, 67.13
See application file for complete search history.

(56) References Cited

U.S. PATENT DOCUMENTS

| 4,470,138 | A | | 9/1984 | Gutleber |
| 5,596,439 | A | * | 1/1997 | Dankberg et al. ............. 398/35 |
| 5,963,559 | A | * | 10/1999 | Ohki ........................... 370/445 |
| 7,046,688 | B2 | * | 5/2006 | Amou et al. ................. 370/418 |
| 2003/0031279 | A1 | * | 2/2003 | Blount et al. ................ 375/346 |

OTHER PUBLICATIONS

S. Toumpis et al., "Capacity regions for wireless ad hac networks", 2002 IEEE Int Conf on Communications, Apr.-May 2003, pp. 3168-3173, vol. 5.

(Continued)

*Primary Examiner*—Nay Maung
*Assistant Examiner*—Tuan H. Nguyen
(74) *Attorney, Agent, or Firm*—Nixon & Vanderhye P.C.

(57) ABSTRACT

In accordance with the invention, signal information representative of a first set of information to be transmitted more than one time over at least one link is stored as a priori known signal information. This could be previously received and/or, detected information, own transmitted information or otherwise available relevant signal information in the node. Signal information representative of a second set of information is received, wherein a transmission of the first set of information interferes with the reception of the second set of information. In spite of the interference, at least part of the second set of information can still be successfully be detected by exploiting the received signal information and at least part of the previously stored a priori known signal information. The information is detected by interference cancellation based on the received signal information and relevant parts of the a priori known information. The set of priori known signal information is preferably updated by continuously storing newly detected information.

35 Claims, 17 Drawing Sheets

OTHER PUBLICATIONS

Stavros Toumpis and Andrea J. Goldsmith; "Capacity Regions for Wireless Ad Hoc Networks;" IEEE Transactions on Wireless Communications, vol. 2, No. 4; Jul. 2003; pp. 736-748.

Randolph Nelson and Leonard Kleinrock; "Spatial TDMA: A Collision-Free Multihop Channel Access Protocol;" IEEE Transactions on Communications, vol. Com-33, No. 9; Sep. 1985; pp. 934-944.

A.S. Tanenbaum; "Computer Networks;" Prentice Hall; 1996; pp. 246-254.

Bertsekas et al.; "Data Networks;" Prentice Hall, 1991; pp. 350-351.

Phil Karn; "MACA—A New Channel Access Method for Packet Radio;" Proc. ARRL/CRRL Amateur Radio $9^{th}$ Computer Networking Conference; pp. 134-140; London, UK; Sep. 1990.

Vadauvur Bharghavan; "MACAW: A Media Access Protocol for Wireless LAN's;" in Proc. ACM SIGCOMM'94; pp. 212-225; London, UK; Aug.-Sep. 1994.

Fouad A. Tobagi and Leonard Kleinrock; "Packet Switching in Radio Channels: Part II—The Hidden Terminal Problem in Carrier Sense Multiple-Access and the Busy-Tone Solution;" IEEE Transactions on Communications, vol. 23, No. 12; pp. 1417-1433; Dec. 1975.

Brooke Shrader and Tim Giles; Scheduling and Performance of Multihop Radio Networks with Multiuser Detection; Proc. Second Swedish Workshop on Wireless Ad-Hoc Networks, Stockholm; Mar. 2002.

Martha Steenstrup and G. S. Lauer; "Routing in Communications Networks;" Prentice Hall, 1995; pp. 357-396.

Abbas El Gamal and Thomas M. Cover; "Multiple User Information Theory;" Proceedings of the IEEE, vol. 68, No. 12; Dec. 1980; pp. 1466-1483.

Peter Larsson; "Large-Scale Cooperative Relaying Network with Optimal Coherent Combining under Aggregate Relay Power Constraints;" Dec. 2003.

* cited by examiner

INTERFERENCE CANCELLATION IN WIRELESS RELAYING NETWORKS

This application is the U.S. national phase of international application PCT/SE2004/000633, filed 26 Apr. 2004, which designated the U.S. and claims benefit of U.S. 60/470,425, filed 15 May 2003, the entire contents of each of which are hereby incorporated by reference.

TECHNICAL FIELD

The present invention generally relates to communication networks, and more particularly to wireless networks such as multi-hop, ad-hoc and cooperative relaying networks, where multiple users share a common communication medium, and the invention targets performance enhancements in such networks.

BACKGROUND

Protocols for sharing a wireless medium effectively among multiple users are generally denoted multiple access protocols, channel access schemes or medium access schemes. For efficient (and often fair) sharing of the wireless medium, various channel access schemes have been developed over the years particularly targeted for distributed networks, such as multi-hop/ad-hoc networks.

Classical multiple access protocols may be divided in two main categories, conflict-free protocols and contention-based protocols.

Conflict-Free Multiple Access Protocols

Conflict-free protocols, which sometimes are referred to as scheduled channel-access protocols, ensure that a transmission, whenever made, is successful; i.e. not interfered by other transmissions. Conflict-free transmission can be achieved by allocating the channel to the users either statically or dynamically. This is often denoted fixed or dynamic scheduling respectively. The benefit of precise coordination among stations is that it is conceived to achieve high efficiency, but comes at the expense of complexity and exchange of sometime large quantities of control traffic.

In [1], Kleinrock and Sylvester suggested to schedule and reuse TDMA time slots spatially. The idea is to assemble groups (also called collision-free vectors or cliques) of links that can be used at the same time without causing mutually harmful interference. A number of such groups may be identified, and these groups are then cycled through in a TDMA-frame like manner. This scheme is generally denoted STDMA and stands for Spatial TDMA.

Contention-Based Multiple Access Protocols

Contention-based protocols differ in principle from conflict-free protocols in that a transmission is not guaranteed to be successful. The protocol should therefore prescribe a procedure to resolve conflicts once they occur so that all messages are eventually transmitted successfully.

A classical problem in packet radio networks, or ad hoc networks, is the existence of so-called hidden terminals. With reference to FIG. 1, the hidden terminal problem means that a node A transmitting to B is unaware of another node C's transmission to D (or possibly to B) which interfere with A's transmission at B. The result is obviously a collision at B that degrades performance in all aspects (throughput, delay and so forth). Means for tackling this problem has been suggested since the mid 1970's and consequently we will look at the classical "solutions" shortly. However, first note that CSMA [1] does not handle this problem since C and A per definition do not overhear each other's transmissions. Carrier sensing is therefore deemed unsuitable for packet radio networks [3]. In the worst case, the performance of CSMA degrades to the performance of ALOHA [1].

Various contention-oriented methods to handle the hidden terminal problem is described in the following:

Multiple Access With Collision Avoidance (MACA)

A method called MACA (Multiple Access With Collision Avoidance) by Karn [4] is based on sending a Request to Send (RTS) and Clear to Send (CTS) to ensure that neighbors of B are aware of whom will send. Assume that A issues an RTS, B responds with a CTS provided that it has received the RTS. Node A receives the CTS message and initiates the data transmission. C on the other hand refrains from transmitting anything as it has heard the CTS from Node B. Similarly, nodes in the vicinity of node, A which hears the RTS message refrain to transmit anything as A is waiting for the CTS message. A back-off scheme is employed for mitigating the impact of reoccurring collisions of RTS messages.

MACAW

In [5], Bhargawan et al. improved the MACA protocol and renamed it MACAW. They introduced link layer Acks as well as CSMA for the RTS messages. They also improved fairness by running the back-off scheme based on source-destination pair rather than node. Means for congestion control was also added. IEEE 802.11 now employs a very similar RTS-CTS scheme called DFWMAC in one of it's operating modes.

Busy Tone Multiple Access (BTMA)

A rather similar approach to MACA is the Busy Tone Multiple Access scheme, BTMA [6]. Rather than sending a CTS message, node B indicates that it is busy with a tone on some parallel channel (read other frequency). This can be done provided B has received its address content. However another and much less useful alternative proposed method is that all nodes detecting a packet transmission sends out a busy tone. The latter alternative will cause severe blockage of a large area. The practical use of either scheme has been rather limited and mostly flourished in academic papers.

Other Classical Multiple Access Protocols

Another medium access technique is based on Direct Sequence Code Division Multiple Access, DS-CDMA. In principle, two approaches are possible.

For example, referring once again to FIG. 1, mechanisms can be implemented which aim to ensure that node A and C uses orthogonal codes and hence does not interfere with each other.

Another approach is to exploit receiver directed spreading codes. The latter assumes that C sends its data towards a node D. It is noted that by using orthogonal codes, the available bandwidth resources are divided by the sender.

Multi-User Oriented Multiple Access Protocol

In [7], a multiple access protocol is described that combines STDMA and multi-user detection. In this method, transmissions are scheduled in time, space as well as in receive power. The transmit power levels are chosen such that multiple transmissions can be received concurrently and decoded through usage of a multi-user detector. The benefit is that the network throughput is improved over classical channel schemes.

SUMMARY OF THE INVENTION

The present invention overcomes these and other drawbacks of the prior art arrangements.

It is a general object of the present invention to target performance enhancements in wireless relaying networks such as multi-hop, ad-hoc, cooperative relaying networks and repeater-based networks, where multiple users share a common communication medium.

In particular, it is desirable to enhance network performance with respect to throughput and delay.

Yet another object of the invention is to provide an improved method and arrangement for detecting signal information in a wireless relaying network.

These and other objects are met by the invention as defined by the accompanying patent claims.

The invention is based on the observation that most interference is caused by packets that are transmitted multiple times over at least one link and usually over more than one link, especially in wireless relaying networks such as multi-hop networks, cooperative relaying networks and repeater-based networks. In multi-hop networks, for example, information may be transmitted in multiple hops or segments between source and destination. Although multiple transmissions may be due to retransmission, the primary reason is that the same packet or information is forwarded from node to node until the destination is reached.

In accordance with the invention, which aims at exploiting already available information in the signal detection process, signal information representative of a first set of information including at least one data unit to be transmitted in total more than one time over at least one link is stored as a priori known signal information. This could be previously received and/or detected information, own transmitted (including also forwarded) information or otherwise available and relevant signal information in the node. Subsequently, signal information representative of a second set of information is received, wherein transmission of one or more of the data units of the first set of information interferes with the reception of the second set of information. In spite of the interference, at least part of the second set of information can still be successfully be detected by exploiting the received signal information and at least part of the previously stored a priori known signal information. The information is preferably detected by interference cancellation based on the received signal information and relevant parts of the a priori known information.

For example, the stored a priori known signal information may include own transmitted information, previously received and detected information, even previously overheard information.

In many applications, the first set of information includes one or several data units to be transmitted in total more than one time over more than one link.

It is advantageous to continuously update the set of a priori known signal information, preferably by incorporating newly detected information and removing outdated information.

The invention thus adds a new dimension to the channel access problem, through the novel mechanism of storing and exploiting a priori known information, thereby enhancing network performance and effectively solving the classical hidden terminal problem. More particularly, it has been shown that the invention provides higher throughput and reduced delay.

The detection can be done per bit or symbol or per sequence of bits or symbols, for a single user or for multiple users. The detection may take place on coded information or on information bits. This means that the detected information may in fact be demodulated coded information and/or both demodulated and decoded information.

As indicated above, the invention is generally applicable to wireless relaying networks such as multi-hop networks, cooperative relaying networks and repeater-based networks.

It should be understood that many different types of interference cancellation, including both explicit and implicit interference cancellation techniques, can be used by the invention. For example, the detection process may involve removal of a priori known signal information from the received signal information to generate a residual signal, and then the residual signal is decoded. Alternatively, the information may be detected by jointly processing a priori known information in the form of previously received baseband signal information together with the currently received baseband signal information.

The detection process may further be based on transmission schedule information in order to more precisely correlate the utilization of a priori known signal information with the transmission instances of the interfering signal information.

The invention offers the following advantages:
  Enhanced network performance;
  Higher throughput and reduced delay;
  Effective solution to the classical hidden terminal problem;
  Higher probability of successful signal detection;
  Opens up for specially designed MAC (Medium Access Control) protocols, routing methods, RRM (Radio Resource Management) schemes that may enhance performance even further.

Other advantages offered by the present invention will be appreciated upon reading of the below description of the embodiments of the invention.

BRIEF DESCRIPTION OF THE DRAWINGS

The invention, together with further objects and advantages thereof, will be best understood by reference to the following description taken together with the accompanying drawings, in which.

DETAILED DESCRIPTION OF EMBODIMENTS OF THE INVENTION

Figure 1:
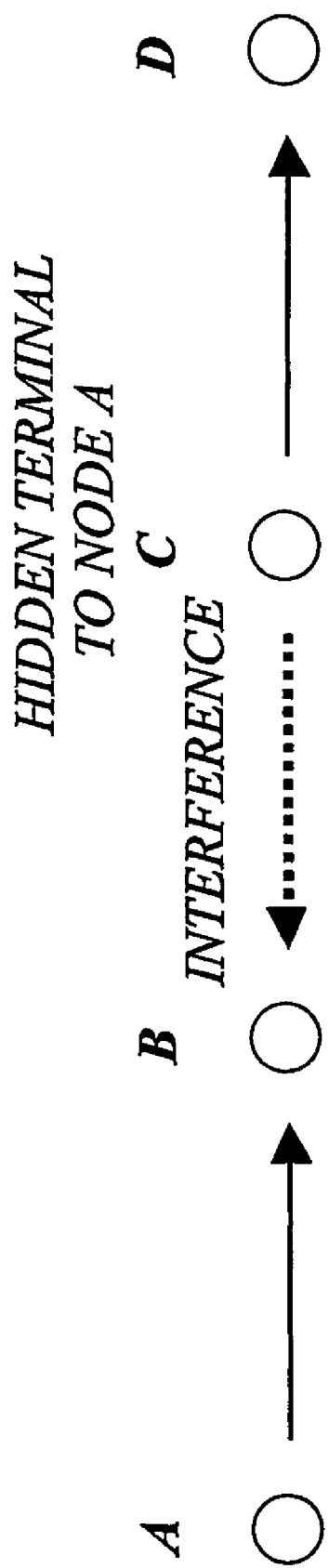
FIG. 1 illustrates the classical hidden terminal problem.

Throughout the drawings, the same reference characters will be used for corresponding or similar elements.

As mentioned earlier, the state-of-the-art methods are not optimal with respect to throughput and delay. The invention is based on the observation that most interference is caused by packets that are transmitted multiple times over one or more links, especially in wireless relaying networks such as multi-hop networks, cooperative relaying networks and repeater-based networks.

The invention aims at exploiting already available information in the signal detection process, and is preferably based on:

Storing signal information representative of a first set of information, including at least one data unit to be transmitted in total more than one time over at least one (often more than one) link, as a priori known signal information;

Receiving signal information representative of a second set of information, wherein transmission of one or more of the data units of the first set of information interferes with the reception of the second set of information; and Detecting at least part of the second set of information by interference cancellation based on the received signal information and at least part of the previously stored a priori known signal information.

The first and second sets of information may each include one or more data units, and both single-user detection and multi-user detection are possible detection alternatives that can be selected according to application and design choice. It should be understood that many different types of interference cancellation, including both explicit and implicit interference cancellation techniques, can be used by the invention.

In this way, by maintaining and exploiting a priori known signal information, the classical hidden terminal problem can be effectively solved, resulting in enhanced overall network performance.

The invention thus provides a receiver and/or signal detection module (decoder) that takes advantage of the occurrence of multiple transmissions. This also opens up for the development of specially designed MAC (Medium Access Control) protocols, routing methods, RRM (Radio Resource Management) schemes and so forth to further enhance performance.

Although the conventional multi-user detector approach is a good effort when opting for maximal throughput, it fails to take advantage of available information.

It should also be noted that hybrid ARQ (Automatic Repeat reQuest) schemes may take advantage of older previously sent information. In hybrid ARQ, however, the previously sent information and the subsequently re-transmitted information are transmitted at different time slots to the same node over the same link, and the scheme is simply used for efficient ARQ and not for interference cancellation purposes.

Note that although the focus in the following will be on multi-hop networks and so-called cooperative relaying networks, the invention is generally applicable to wireless relaying networks where the same information may be transmitted multiple times over multiple links, including also repeater-based networks.

In the following, two basic exemplary concepts will be described. The first focuses on a somewhat more practical approach where detected packets are utilized. This will serve as an introduction and motivation of the main theme. The second concept is more general, and by necessity performs better as more information is retained and exploited, but exhibits higher complexity. A third hybrid version is subsequently presented striking a balance between the low complexity of the first concept and the high performance offered by the second concept.

Exemplary Concept 1

As stated earlier, some of the interference in a multi-hop network is caused by earlier received and forwarded packets or just overheard packets from other communicating nodes that are transmitted once again. As this information is, in a sense, a priori known it can be removed from the received signal, leaving a residual signal to be decoded. Hence, as signal to noise and interference ratio (SINR) can be improved, system performance will be improved. Such performance enhancements include increased throughput, reduced delay and/or improved robustness at reception.

Figure 2:
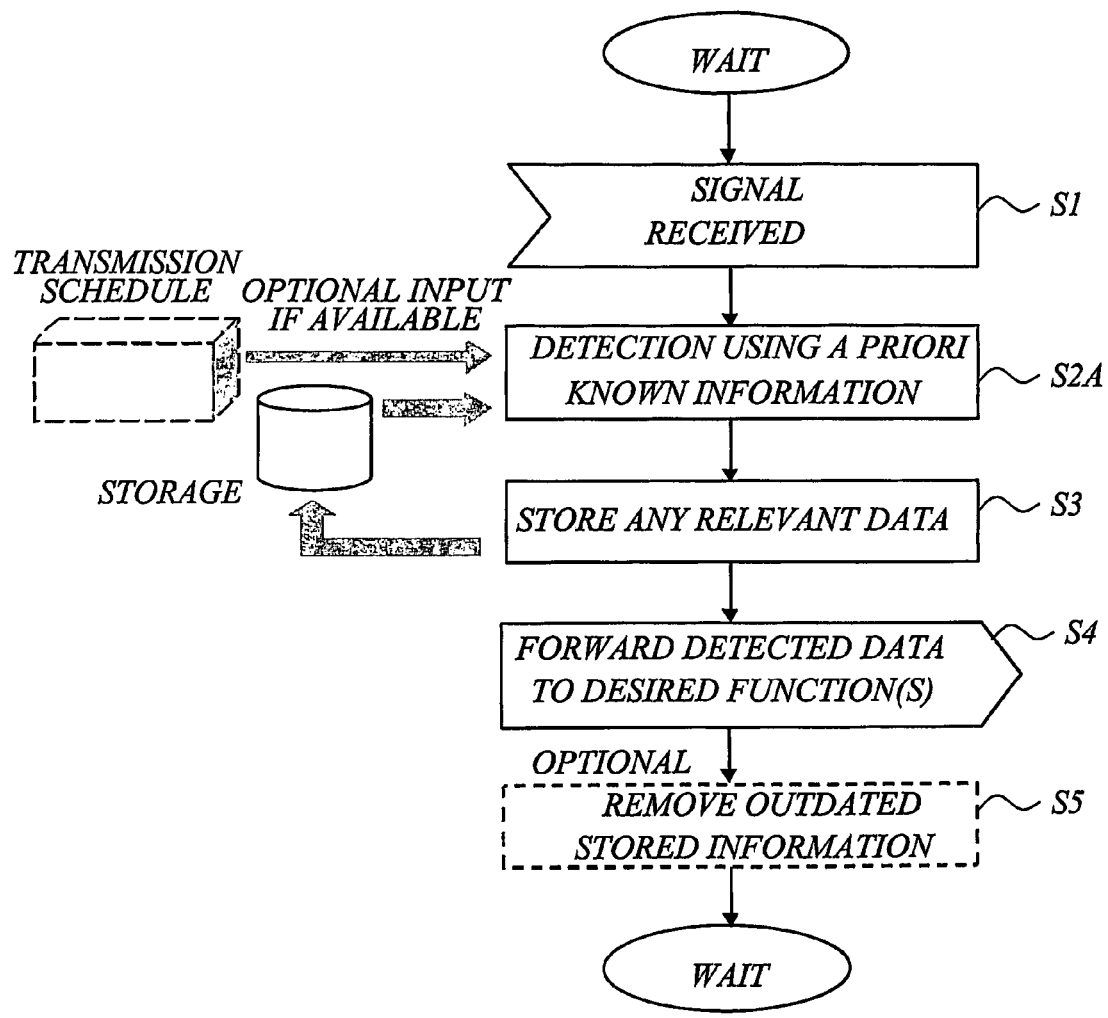
FIG. 2 is a schematic flow diagram illustrating the basic principles of the invention according to a preferred embodiment of the invention.

The basic principles according to a preferred embodiment of the invention are outlined in the flow diagram of FIG. 2 for a detector exploiting a priori known data. In step S1, a signal is received and the presence of and how much a priori known data that is associated with the signal are determined. In step S2A, signal detection is performed based on a priori known information. This may be accomplished by canceling (subtracting) interference caused by the a priori known data from the received signal to generate a residual signal, as will be explained in detail later on. Note that although data is normally represented by a packet, i.e. word of ones and zeros, it is typically one or more copies of the modulated a priori known data sequences that are subtracted from the received signal. However, several methods for detection may be envisioned (as described further later on). Subsequently, the residual signal is decoded and its validity is checked, e.g. through a CRC (Cyclical Redundancy Check).

If the check is passed, then the newly detected or decoded data is stored together with previously detected or decoded data sequences in step S3 so that the a priori known signal information is continuously updated. The information may for responsiveness preferably be stored as modulated sequences (given that the interference subtraction method described later on is used), but in case of limited storage and when speed is not an issue, it is stored as pure data sequences with ones and zeros. In step S4, the decoded data is also forwarded to the next appropriate function that may typically be a higher layer. After sending the data to higher layers, it may either be routed to another node or used by an application residing within node. Alternatively, if layer 1 forwarding is employed, e.g. with a regenerative repeater function, the decoded data may be sent to a buffer in layer 1 and subsequently transmitted. In another layer 1 forwarding example employing a non-regenerative repeater function, the residual signal (i.e. after the interference of a priori known sequences is cancelled) may be sent to a buffer in layer 1 and subsequently transmitted. Note that the explicit use of the decoded data is not the concern here. The order in which the data is stored and forwarded to the next layer is arbitrary. Finally, as some data gets further and further away, and hence does not cause any detrimental interference in the considered receiver, or ultimately arrives at the destination node and hence not sent any more, it is of no use to cancel the influence of such data. Therefore, in step S5, this data can be removed from the list of a priori detected sequences. The removal can for example be timer initiated (very old messages are likely to be outdated, though not guaranteed), or triggered by explicit signaling.

Figure 3:
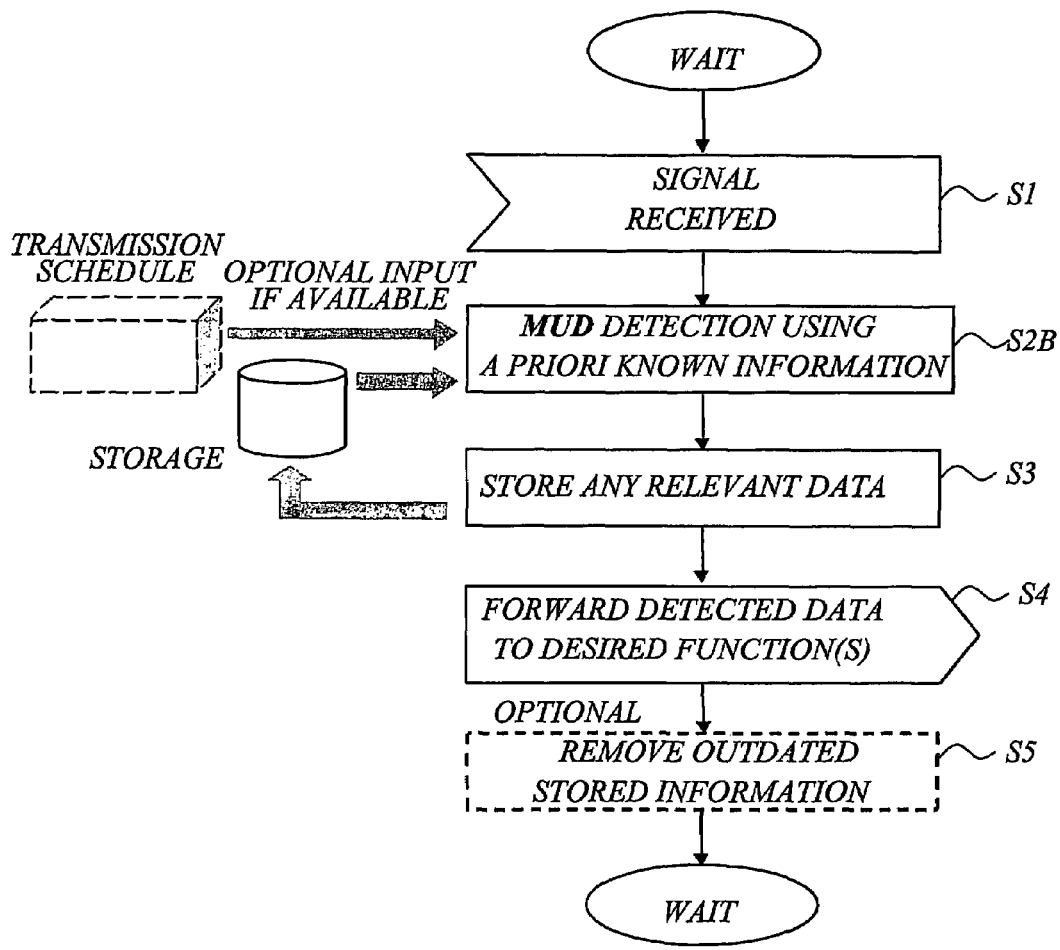
FIG. 3 is a schematic flow diagram illustrating the basic principles of the invention, based specifically on multi-user detection, according to a preferred embodiment of the invention.

The above scheme can be adapted/extended to the case of multi-user detection, as illustrated in FIG. 3. A general form of detector is a multi-user detector (MUD) that receives multiple packets at the same time and tries to detect a specific number of messages, or as many messages as possible from the received signal. In accordance with a preferred embodiment, the multi-user detection is performed by also taking into account a priori known detected or decoded packets, as indicated in step S2B. Subsequently, the set of detected or decoded packets is updated to include the newly detected or decoded packets.

Figure 4:
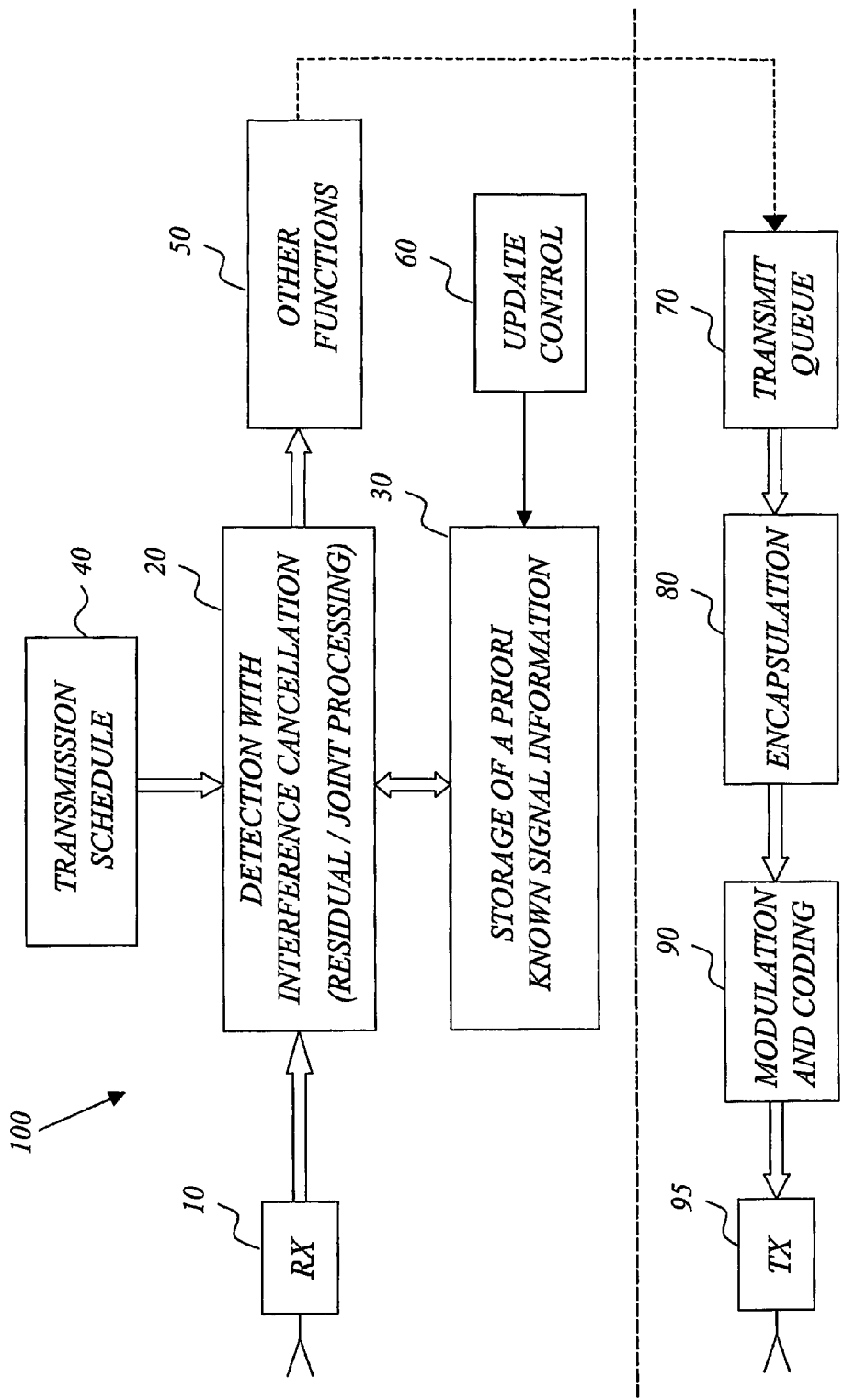
FIG. 4 is a schematic block diagram illustrating a network node incorporating an arrangement for interference cancellation based on a priori known information according to a preferred embodiment of the invention.

FIG. 4 is a schematic block diagram illustrating a network node incorporating an arrangement for interference cancellation based on a priori known information according to a preferred embodiment of the invention. The network node 100 is logically divided into a receiving part and a transmitting part, and basically comprises an antenna connected to a conventional receiver chain 10, a detector unit 20, a storage unit 30 for a priori known signal information, a transmission schedule information unit 40, other (higher layer) functions 50, an update control unit 60, a transmit queue 70, an encapsulation unit 80, modulation and coding 90 and a transmission chain 95 connected to an antenna.

The invention mainly concerns the receiver structure of the network node 100, and the main novelty is to maintain a priori known signal information in the storage unit 30, and exploit this information in the bit and/or sequence detection (demodulation and/or decoding) process performed by detector unit 20. The detector unit 20 may be a single-user detector or a multi-user detector, and detects signal information by interference cancellation based on signal information from the receiver chain 10 and a priori known signal information from the storage unit 30. For example, the detection process may involve removal of a priori known signal information from the received signal information to generate a residual signal, and then the residual signal is decoded. Alternatively, signal information may be detected by jointly processing a priori known information in the form of previously received baseband signal information together with the currently received baseband signal information. The detection process may further be based on transmission schedule information from unit 40, as will be explained in more detail later on.

After detection, the detected or decoded data is typically forwarded to the next appropriate function 50 that may typically reside on a higher layer. After sending the data to higher layers, it may either be routed to another node or used by an application residing within node. When data is to be transmitted to another node, it is placed in the transmit queue 70. From there, the data is transferred to the encapsulation unit 80 for encapsulation and addressing. The encapsulated data is then modulated and coded by unit 90 and finally transmitted via the transmission chain 95 and the antenna.

In this particular example, the node is adapted for use in a multi-hop packet radio network. It should though be understood that cooperative relaying and some multi-hop implementations do not necessarily have to use packet headers. There are also cooperative relaying schemes that are based on non-regenerative relaying, which means that some of the above operations, such as modulation, may be omitted.

For a better understanding of the invention, it will be useful to illustrate some exemplary scenarios in which the invention may come into use. First the overall scheme of interference cancellation of own forwarded data will be described with reference to FIGS. 5 and 6, and secondly, interference cancellation of previously overheard data will be described with reference to FIGS. 7A-C.

Own Forwarded/Transmitted Data:

For illustrative purposes, a time-slotted medium access scheme is assumed. With reference to the message sequence diagram of FIG. 5, at time $T_1$ data coded into signal $S_1$ is sent from node A to node B, where we may assume that it is correctly decoded. At $T_2$, $S_1$ is sent from node B to C where it again is assumed to be correctly decoded. At time $T_3$ two packets of data, coded into $S_1$ and $S_2$ respectively, are sent. In the prior art, node B's reception from node A would be interfered by node C's transmission. In the present invention however, as the influence of signal $S_1$ is removed, reception and detection, symbol or sequence detection, of signal $S_2$ will be OK.

The interference at $T_3$ may be significant if the invention is not employed. A simplistic, yet instructive, example is given by considering the Shannon channel capacity for a packet transmission at $T_3$ from node A to node B. With the invention, node B will experience a signal to noise ratio SNR=P·G/N, where P is the transmit power, G is the path gain from node A to node B and N is the noise power. However, if the invention is not used, if node C transmits with power P and the path gain to node B is also G, then the effective signal to noise ratio is instead $SNR_{eff}$=SNR/(SNR+1).

Figure 6:
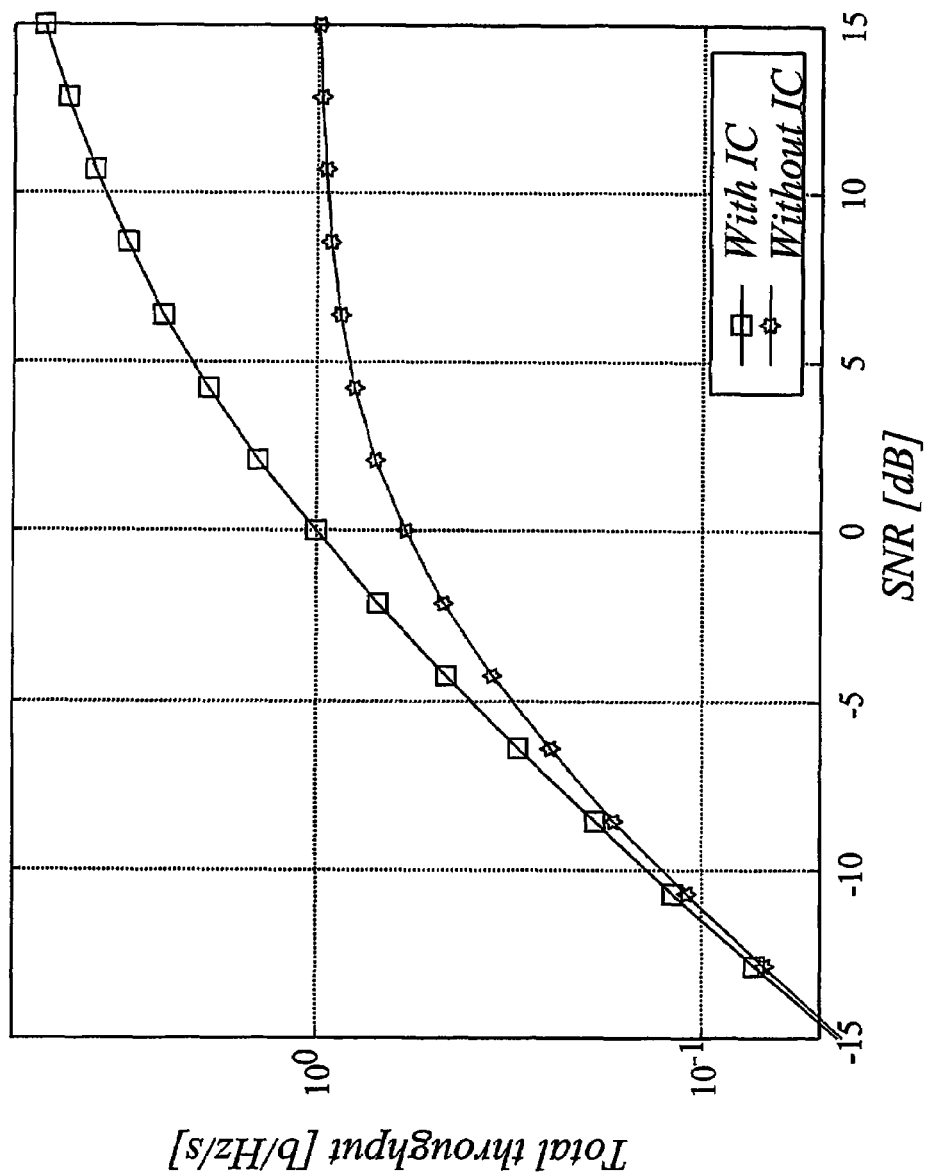
FIG. 6 is a graph illustrating an example of the throughput performance for the system of FIG. 5 as a function of signal-to-noise ratio, with and without the proposed interference cancellation technique.

The Shannon capacity limit is plotted in FIG. 6 to illustrate an example of the throughput performance with and without the proposed interference cancellation method. In practical multi-hop systems, this is a serious problem and therefore the reuse distance has to be increased so as not to cause this devastating interference effect. This in turn implies reduced throughput.

Figure 5:
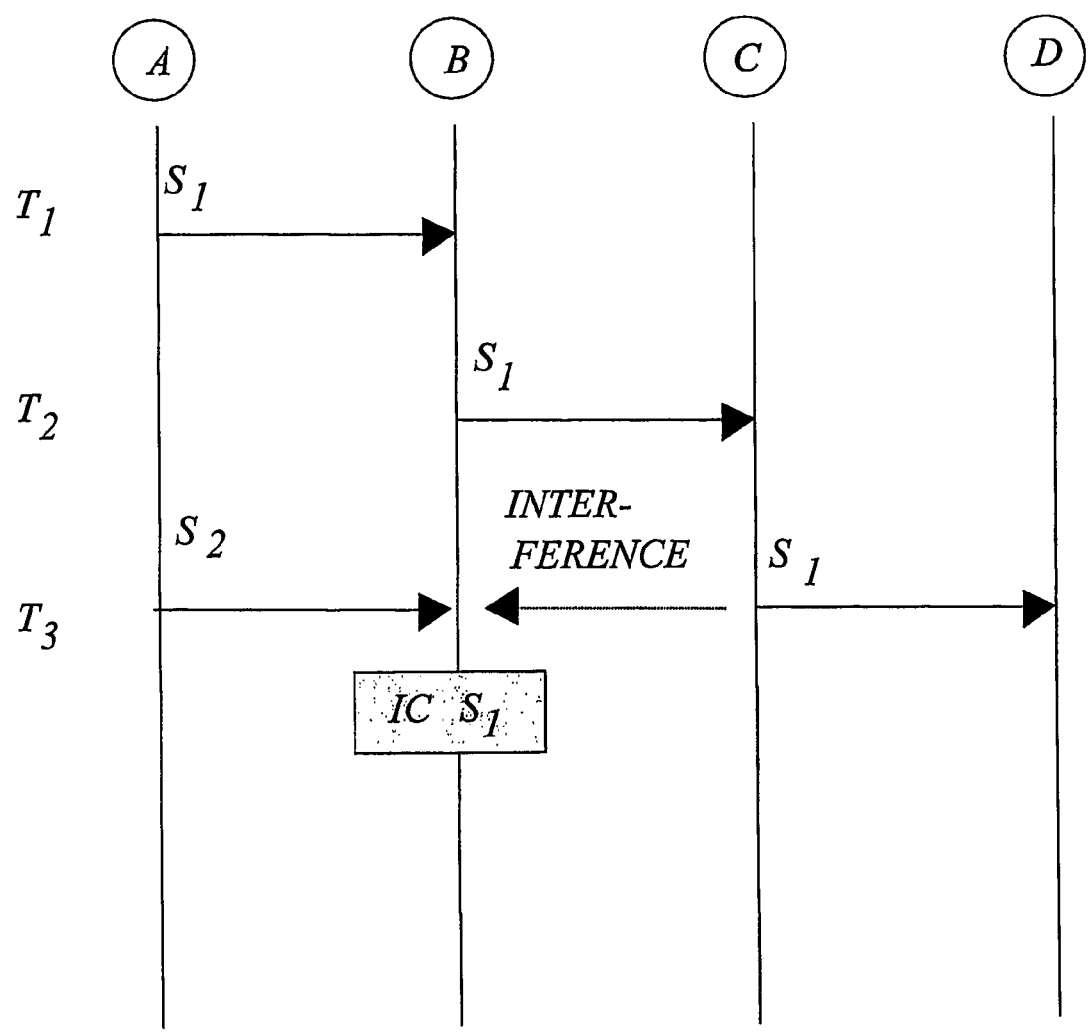
FIG. 5 is a schematic sequence diagram illustrating an exemplary case of canceling interference caused by own forwarded data.

Overheard Data:

In addition to the example shown in FIG. 5, some examples of a different scenario are shown in FIGS. 7A-D where overheard data is used in subsequent interference cancellations.

Figure 7A:
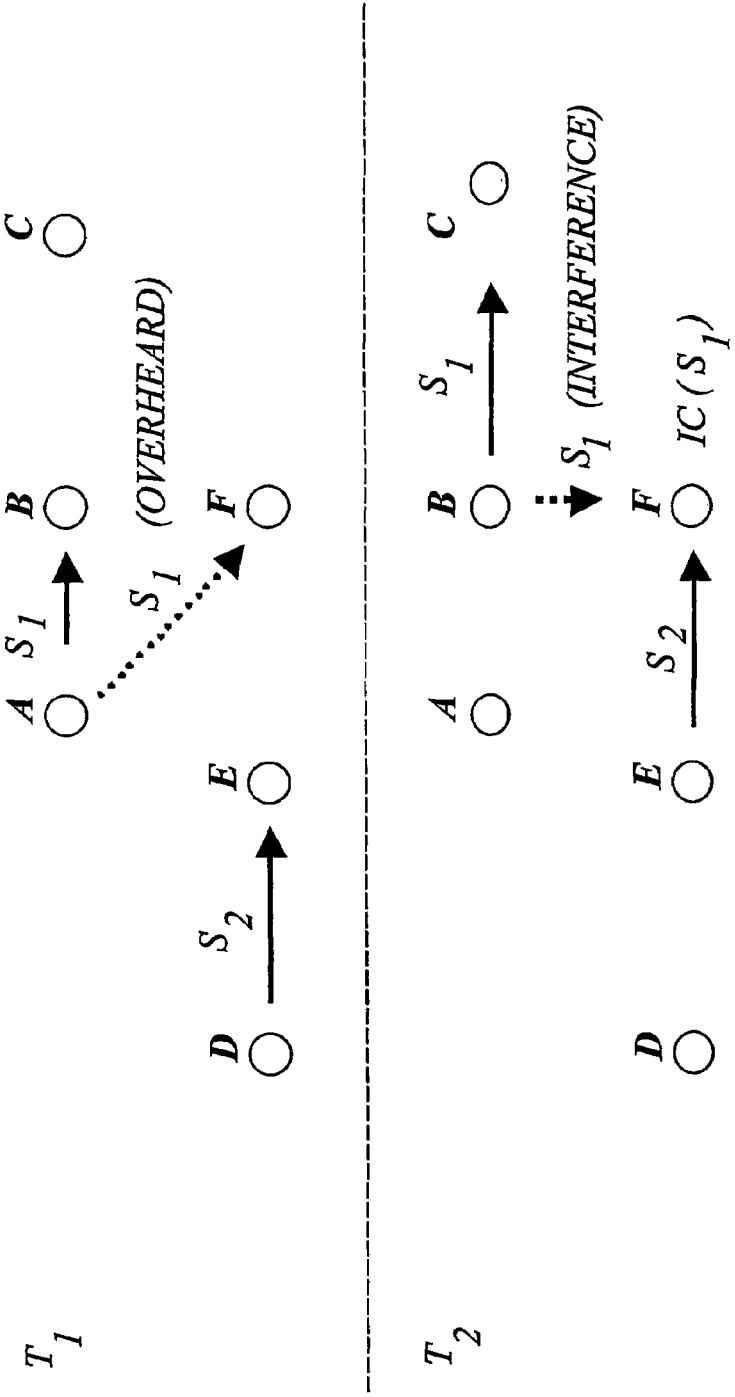
FIGS. 7A-D are schematic sequence diagrams illustrating exemplary cases of canceling interference caused by overheard data.

More particularly, in FIG. 7A, two data sequences encoded into signal $S_1$ and $S_2$ are sent over different but adjacent paths. At time $T_1$, node F overhears (and correctly decodes) signal $S_1$ transmitted over the link from node A to B. The signal $S_1$ is stored in node F as a priori known information. At time $T_2$, node B transmits $S_1$ over another link to node C and causes interference in relation to node F. Node F receives and decodes signal $S_2$ sent from node E by canceling the interfering transmission $S_1$ sent from node B to C.

The performance improvement is hard to determine analytically, but initial simulations have shown that a priori known signals can be successfully suppressed to enhance the overall throughput. However, the performance is typically dependent on the scheduling of who receives, who transmits, what is transmitted and when. It is shown for a trivial case that it can be theoretically guaranteed and quantified that the invention improves communication fidelity. Still, it is expected that the gain in the multi-hop case will generally be much higher since more than one message is generally cancelled and that recently overheard or forwarded traffic generally generates local detrimental interference.

Figure 7B:
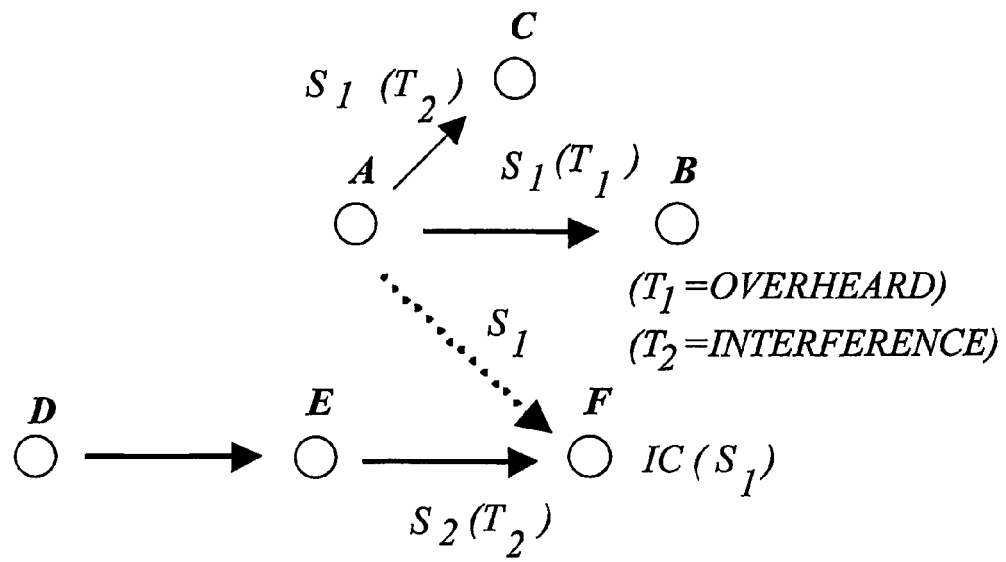

FIG. 7B illustrates the scenario of a so-called multicasting node A, which a time T1 transmits a signal $S_1$ to some other node, here denoted B. This signal is overheard (and correctly decoded) by an adjacent node F, which stores the signal $S_1$ as a priori known signal information. At time $T_2$, node A transmits $S_1$ to yet another node, here denoted C, and hence causes interference in relation to node F when it receives signal $S_2$ sent from node E. Node F properly decodes signal $S_2$ sent from node E by canceling the interfering transmission $S_1$.

Figure 7C:
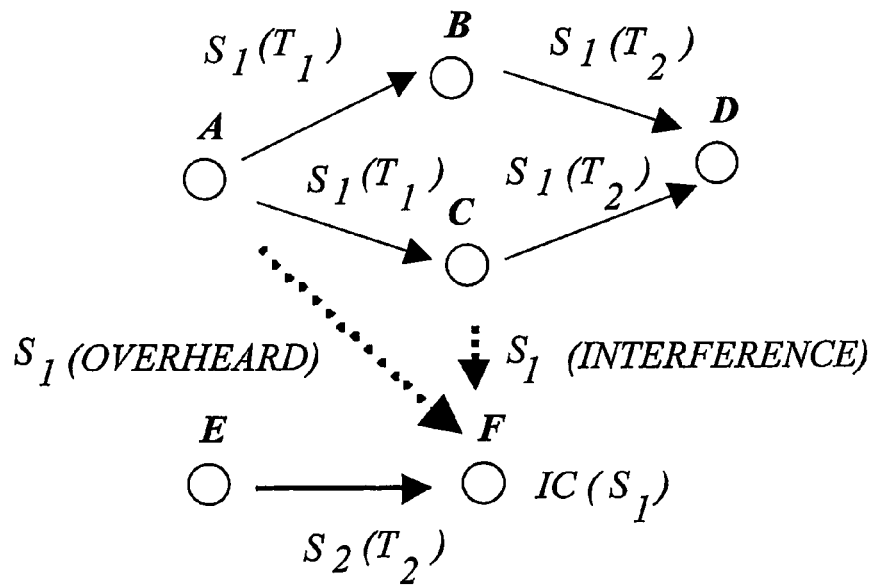

FIG. 7C illustrates yet another scenario, in which node A sends a signal $S_1$ along two parallel paths to node D. At time $T_1$, node A sends $S_1$ to nodes B and C and at time $T_2$, nodes B and C relays $S_1$ to node D. At time $T_1$, the signal $S_1$ is overheard by adjacent node F, which stores the signal $S_1$ as a priori known signal information. At time $T_2$, node F receives and decodes signal $S_2$ sent from node E by canceling the interfering transmission $S_1$ sent from nodes B and C to node D.

Figure 7D:
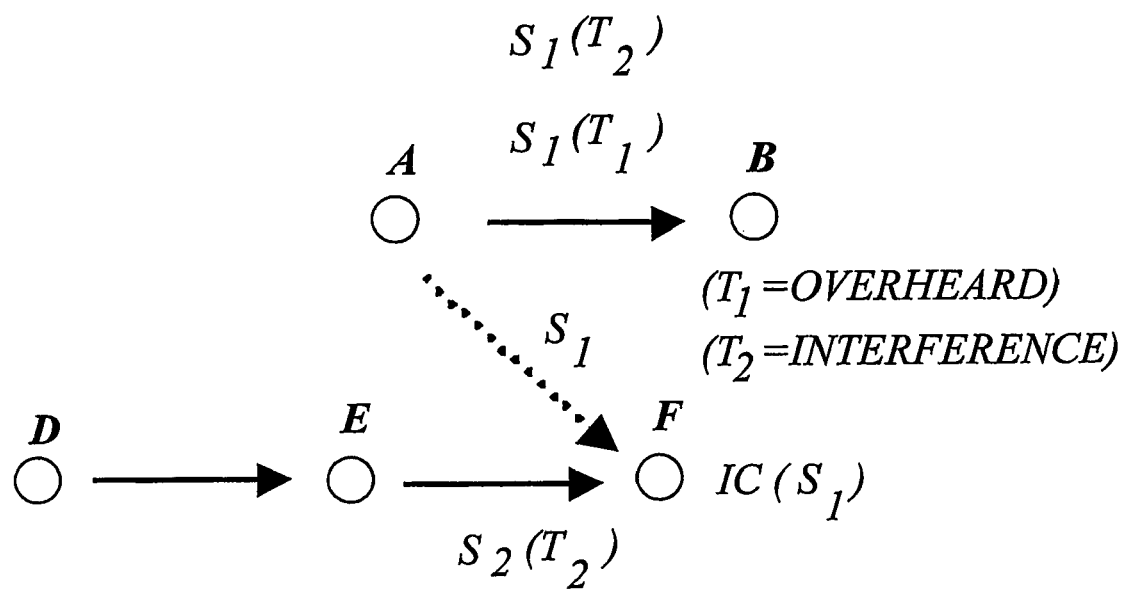

FIG. 7D illustrates an exemplary scenario, in which a signal $S_1$ is sent over the same link between node A and node B at two different time instances $T_1$ and $T_2$. At time $T_1$, the signal is overheard (and correctly decoded) by an adjacent node F, which stores the signal $S_1$ as a priori known signal information. At time $T_2$, node A once again transmits $S_1$ to node B, and hence causes interference in relation to node F when it receives the signal $S_2$ sent from node E. Node F properly decodes signal $S_2$ sent from node E by canceling the interfering transmission $S_1$.

Relaying: Bi-Directional Traffic

Figure 8:
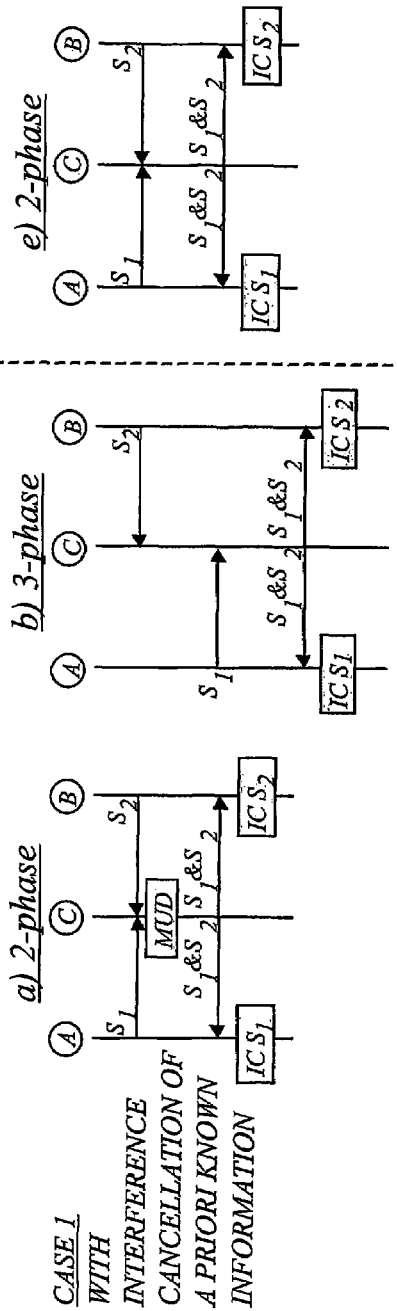
FIG. 8 are schematic sequence diagrams illustrating interference cancellation of a priori known information in a 2-hop relay channel for five exemplifying schemes, including two reference schemes.
Figure 8:
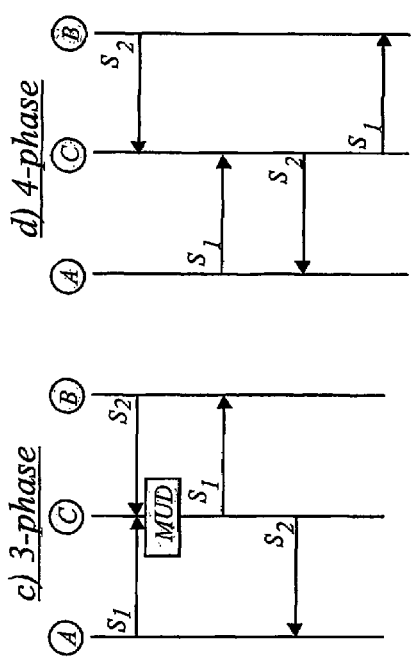

The relay channel is a classical problem in information theory [9]. In particular, the trivial scenario with three nodes has been subject for studies. We will here exemplify the invention in relation to the relay channel with three nodes and more particularly for bi-directional traffic (not generally treated in conjunction with the classical relay channel) between two nodes, A and B, where node C is placed intermediately between the two source nodes. FIG. 8 schematically illustrates interference cancellation of a priori known information in a 2-hop relay channel for five exemplifying schemes a-e, where schemes a, b and e employs the invention and the remaining cases c and d are to be considered as reference cases. Note that in the invention schemes a, b and e, node C divides the available transmit power between information $S_1$ and $S_2$. Multi-user detection is employed whenever needed. In cases a and e, the signal exchange takes place in 2 phases, in cases b and c in 3 phases and in case d in 4 phases. According to an exemplary embodiment of the invention, node A stores its own transmitted signal S1 and node B stores its own transmitted signal S2, or suitable representations thereof. This enables the intermediate relay node C to concurrently transmit (instead of separated transmissions) the received signals S1 and S2 to node A and node B, since node A will cancel S1 and node B will cancel S2 from the concurrently transmitted signals S1 and S2. In this way, node A will properly decode S2, and node B will properly decode S1. In case a), the overall procedure involves only two phases, employing concurrent transmission both to and from the intermediate relaying node with multi-user detection at the intermediate relay node C and interference cancellation at the nodes A and B.

At closer scrutiny, it is seen that the use of interference cancellation of a priori known information represents a novel extension, never presented before, of the information theory relay channel.

In general, the intermediate relay node is thus configured for concurrently forwarding signal information received from the communicating nodes, each of which is configured for detecting signal information from the other node by interference cancellation using its own transmitted signal information as a priori known information.

Also, note that the invention may be combined with various well-known extensions. For example, in scheme b, if node A and B store and later exploit received energy from the single transmissions from node B and A, respectively. However, the benefit in doing so is generally quite low and may not be worth the effort.

Figure 9:
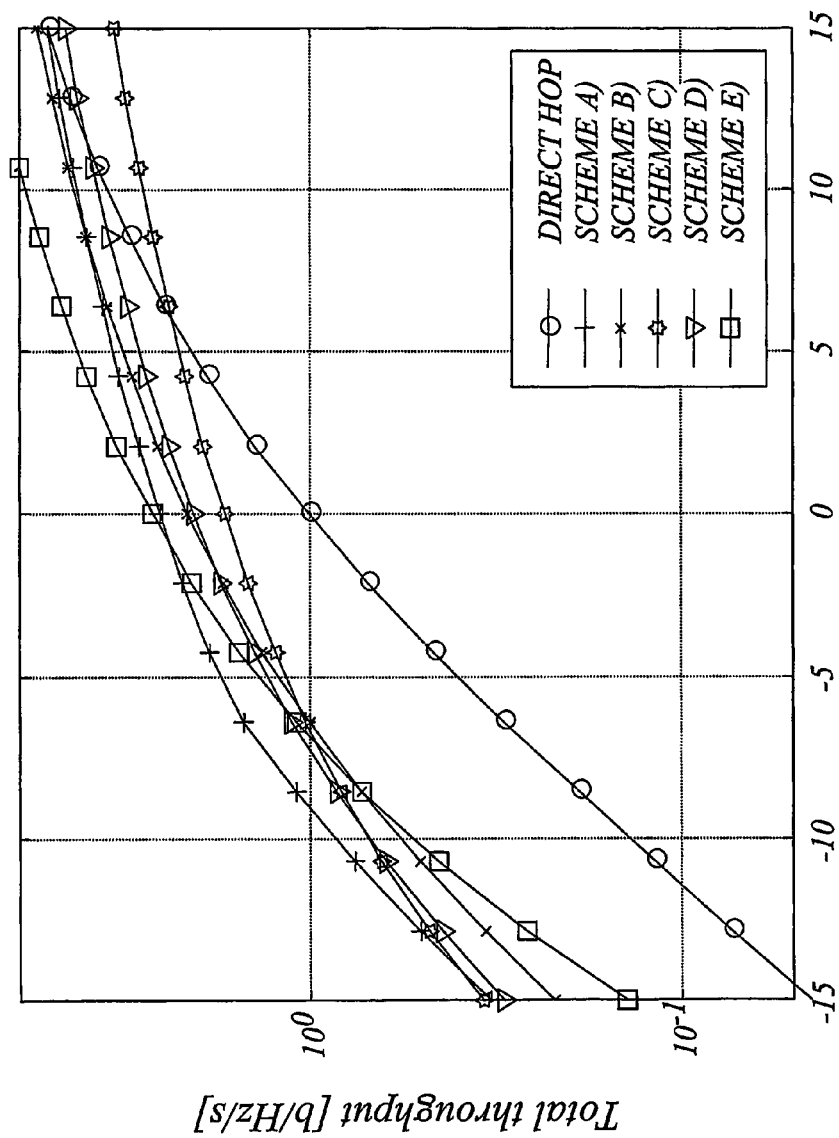
FIG. 9 is a graph illustrating the throughput performance as a function of signal-to-noise ratio for the five exemplifying schemes of FIG. 8.

Assuming equidistant separation of node A to C, and node B to C and that each node is sending with total transmit power P, a power-law path loss model with propagation exponent $\alpha=4$ and the Shannon capacity formula is used, then the total system throughput will follow the graph shown in FIG. 9. See appendix A for derivation details.

It is evident that a) and e) performs best, though in different SNR ranges. For channel efficiencies above 1 b/Hz/s, the gain for the best schemes exploiting the invention (a, b and e) is between 2 to 8 dB better relative the best traditional scheme (c or d). For lower propagation loss constants, e.g. when $\alpha=2$, then the gain is lower and range between 1.5 to 3 dB for the SNR and rate range of interest. Although the gain is not totally unambiguous, it nevertheless clearly demonstrates improved performance over the prior art. However, scheme a) and e) seems the most promising over a wide SNR range.

Other conditions than fixed transmit power level may be employed when comparing the schemes, such as fixed average power (or equivalently energy outtake per cycle).

In doing so, b) would improve its performance with $$10\log_{10}\left(\frac{P/2}{P/3}\right) = 1.8$$

dB and c) would deteriorate its performance with $$10\log_{10}\left(\frac{P/2}{2P/3}\right) = -1.25$$

dB, relative the 2-phase schemes in FIG. 8.

Cooperative Relaying:

The interference cancellation concept based on a priori knowledge may also be used in cooperative relaying networks.

The more recent concept of cooperative relaying may in a sense be seen as a degenerated case of multi-hopping involving only two hops, but at the same time generalized to and allowing for parallel paths as well as signal processing to be exploited. In addition, cooperative relaying may exploit various forms of relayed information such as basic repeater (non-regenerative) functionality or "decode and forwarding" (regenerative) as done traditionally in multi-hop networks.

More information on cooperative relaying may be found, e.g. in reference [10].

Figure 10A:
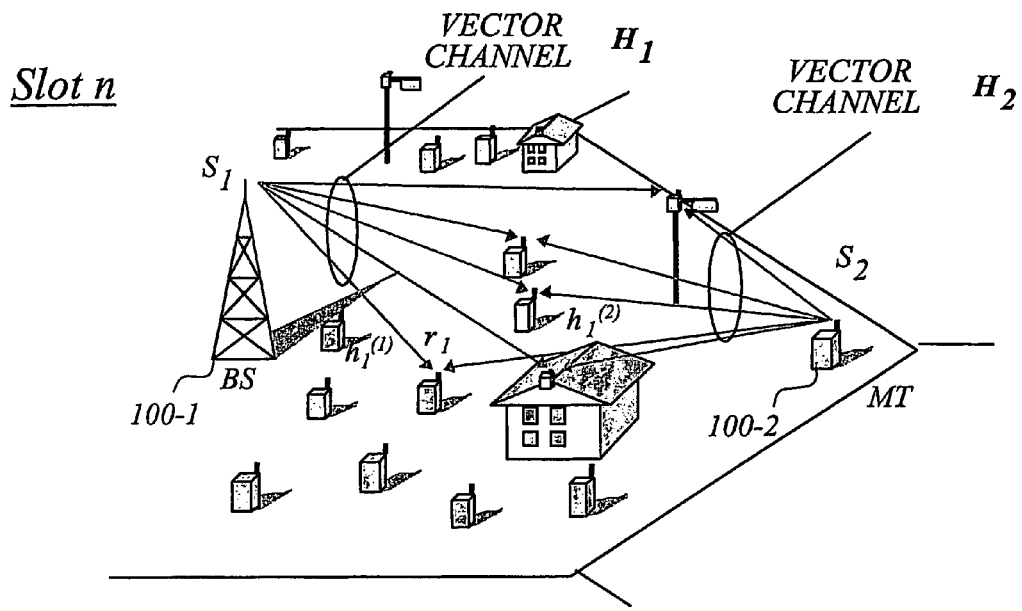
FIGS. 10A-B are schematic diagrams illustrating an example of the concept of cooperative relaying.
Figure 10B:
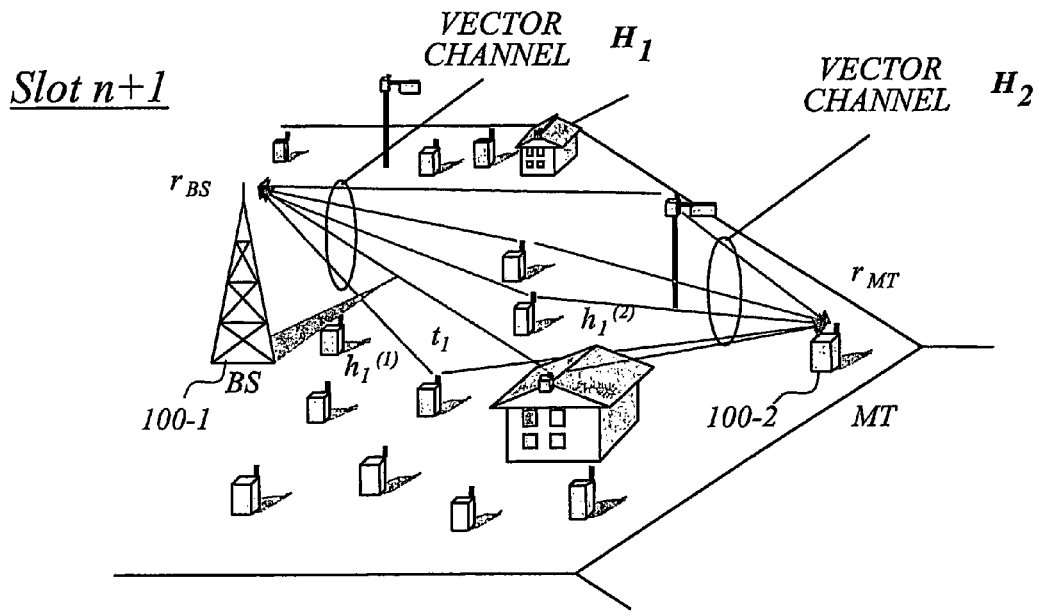

FIGS. 10A-B are schematic diagrams illustrating an example of the concept of cooperative relaying, here exemplified with bi-directional (concurrent) traffic. In FIG. 10A, both the base station (BS) 100-1 and a mobile terminal (MT) 100-2 transmit concurrently in slot n along parallel paths, each path having at least one intermediate node. The received signals are then processed prior to being retransmitted by the relay stations in slot n+1, as indicated in FIG. 10B. The processing may include any combination of, but not limited to, exploiting MUD, inducing various diversity schemes such as Alamouti diversity, delay diversity, using conjugation, negation, reordering of data, different amplification and optionally phase factors.

Figure 11:
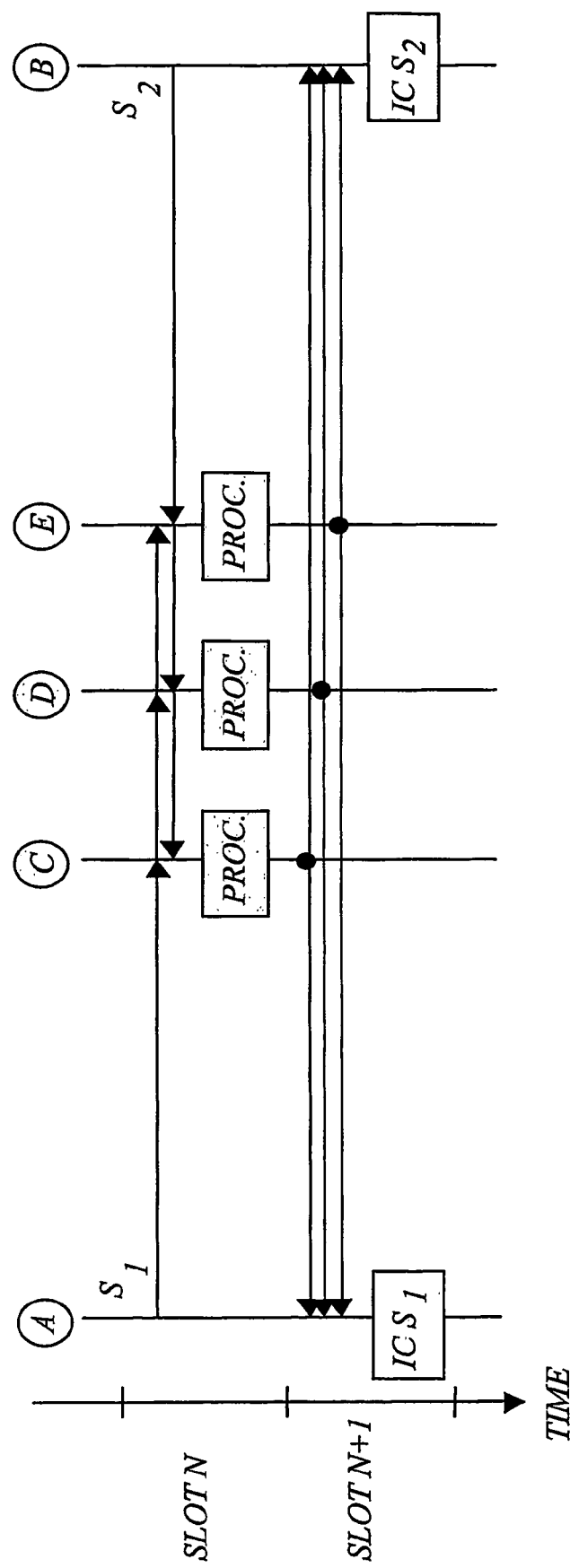
FIG. 11 is a sequence diagram illustrating interference cancellation according to an embodiment of the invention in the case of cooperative relaying.

Both the MT and BS will receive a superposition of information generated by themselves as well as the other station. The important part here, is that based on a priori knowledge of what each station has sent, they may cancel their respective influence. This basic principle is illustrated in FIG. 11, which is a sequence diagram illustrating interference cancellation according to an embodiment of the invention in the case of cooperative relaying. FIG. 11 illustrates the case of two nodes A and B that communicate with each other by means of intermediate relay nodes C, D and E. Each intermediate node has a "processing block" encompassing any of the processing operations described previously. On reception in time slot n+1, each one of the nodes A and B may cancel interfering influence based on a priori knowledge of what the node has sent in time slot n.

It should be emphasized that the described method here may be extended to incorporate more than two stations communicating via a cluster of relays. This could also be extended to a chaining of multiple two-hop cooperative relaying sets, resulting in a multi-hop cooperative relaying hybrid exploiting interference cancellation.

Cooperative Relaying: "Concurrent" Uplink and Downlink Traffic

Figure 12A:
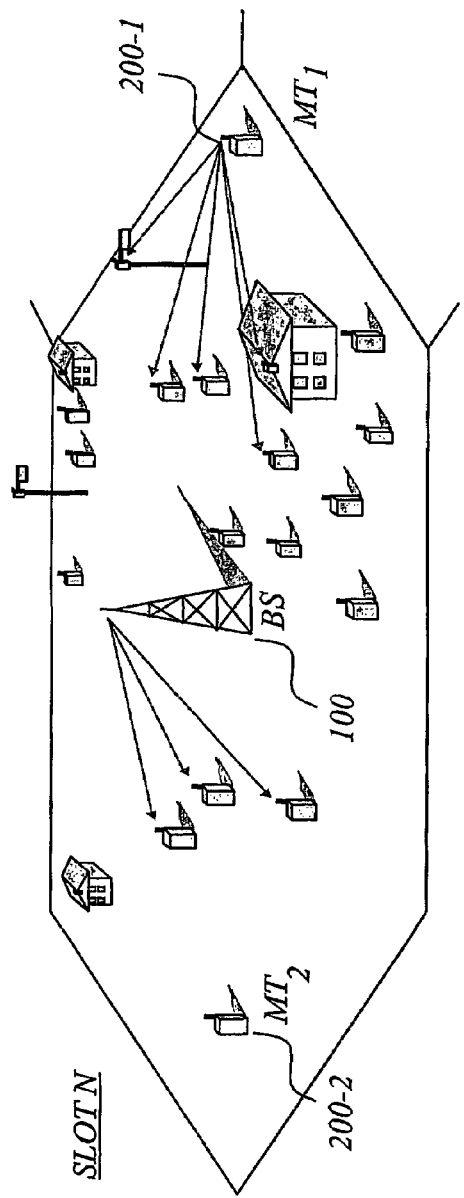
FIGS. 12A-B are schematic diagrams illustrating the concept of cooperative relaying with concurrent uplink and downlink traffic.
Figure 12B:
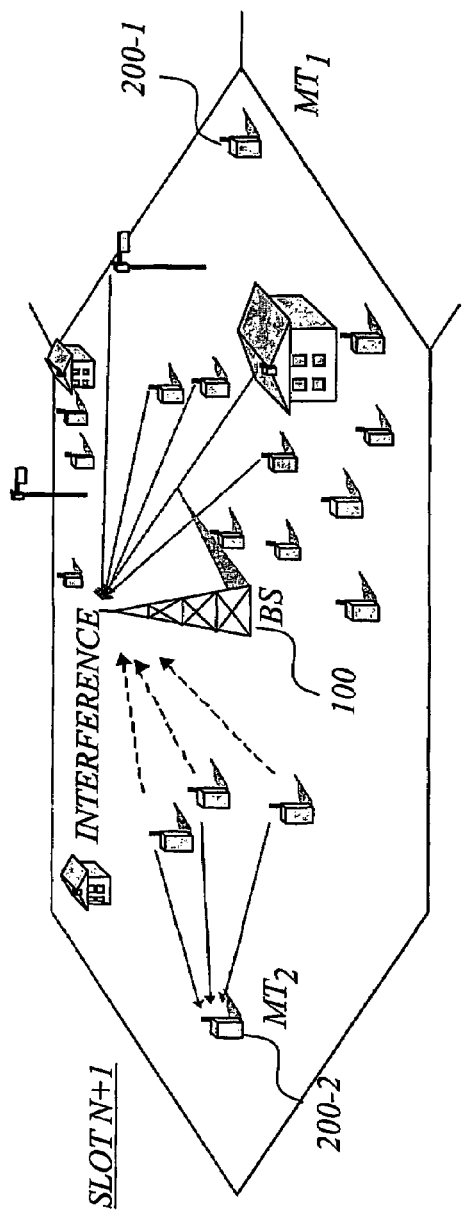
Figure 13:
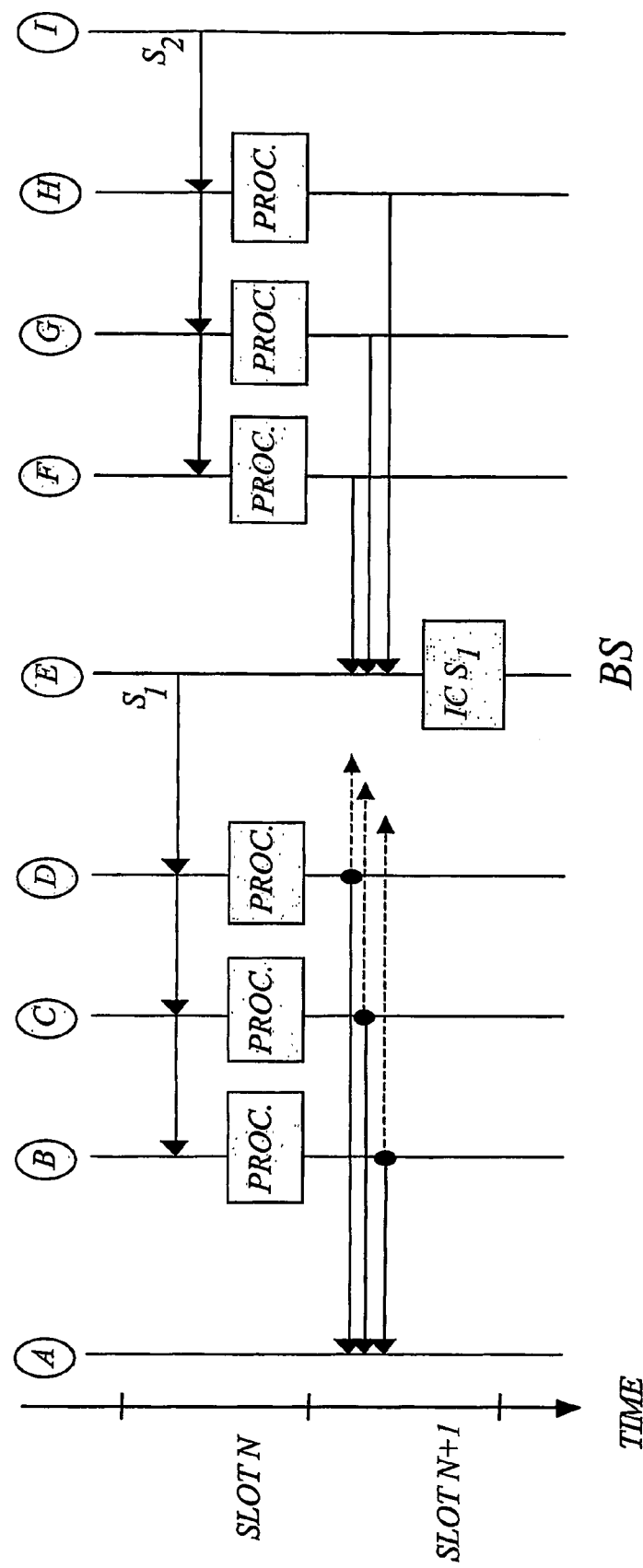
FIG. 13 is a sequence diagram illustrating interference cancellation according to an embodiment of the invention in the case of cooperative relaying with concurrent uplink and downlink traffic.

Another use of interference cancellation of a priori known information in cooperative relaying based networks is shown in FIGS. 12A-B and FIG. 13. The idea here is to allow for "concurrent" transmission in the uplink and downlink, such that two messages arrive at their destination stations in two timeslots, thereby yielding a utilization of one, i.e. two packets per every two timeslots. This has twice the efficiency compared to when traffic is forwarded over two hops in one direction.

In FIG. 12A, which illustrates transmissions in time slot N, a first mobile terminal (MT) 200-1 transmits to a number of relay nodes in the direction towards a base station (BS) 100. The base station 100 transmits to a number of intermediate relay nodes in the direction of a second mobile terminal (MT) 200-2.

In FIG. 12B, which illustrates transmissions in time slot N+1, the intermediate relay nodes that received signal information from the first mobile terminal 200-1 transmit to the base station 100. The relay nodes that received signal information from the base station 100 transmit to the second mobile terminal 200-2, and at the same time cause interference for the base station 100. The interference from $MT_1$ 200-1 to the relays close to $MT_2$ 200-2 is generally minor and will most likely not cause any problem. If it however would cause significant interference, appropriate RRM and scheduling steps may have to be taken.

As seen in FIG. 13, the interference that is cancelled at the base station node E is that of signal $S_1$ when transmitted from the intermediate relays on its way to node A. The processing shown in FIG. 13 is for any of the schemes discussed previously. Note that the same method, as described in FIGS. 12A-B and FIG. 13, may also be applied in a multi-hopping context.

Interference Cancellation

The objective of this section is to exemplify a number of practical interference cancellation techniques that are applicable to the invention. It should however be stressed that other well-known or future interference cancellation techniques may be used.

First, we need an exemplary system model. For example, assume for the sake of simplicity that the system is synchronized and that OFDM (Orthogonal Frequency Division Multiplexing) is used in order to avoid unnecessary detailed discussion on overly precise (timing) synchronization and Inter Symbol Interference (ISI) issues. The idea is general enough to expand to other modulation methods and entirely non-synchronous systems, each of which requires its specific considerations.

We assume that we have in total $d_{max}$ data packets in the network, where each data packet $D^d$ is uniquely identified by index $d=\{1, \ldots, d_{max}\}$. The whole set of all packets is denoted $D_\Sigma = \{D^d; d=\{1, \ldots, d_{max}\}\}$ We further assume that there is a unique function $f_{mod}$ that map the data packets onto modulated symbols according to $S^d = f_{mod}(D^d)$. When a particular node $v_j$ transmits a packet $D^d$, the packet and transmitting node are interconnected by using the notation $D_j^d$ for the (coded/raw) data packet and $S_j^d$ for the corresponding (coded) modulated signal. Further the set $V=\{v_j; j=\{1, \ldots, j_{max}\}\}$ contain all nodes transmitting in timeslot n.

Now assume that in the timeslot of interest, node $v_i$ receives a signal $R_i$, that may be calculated as:

$$R_i = \sum_V H_{ij} \cdot \sqrt{P_j} \, S_j^d + N_i$$

where $H_{ij}$ is the complex channel gain between node $v_j$ and $v_i$, and $P_j$ is the transmit power used by node $v_j$.

At the same time, the storage buffer includes a set of previously demodulated and/or decoded (and estimated) packets $\tilde{D}^\delta$. We denote this set $$\tilde{D}_\Sigma = \{\tilde{D}^\delta; \delta = \{1, \ldots, \delta_{max}\}\}$$

where $\delta$ is used as an index and $\delta_{max}$ is the number of stored data packets.

Alternatively, the corresponding signals to the decoded packets may be stored, i.e. $\tilde{S}_\Sigma = f_{mod}(\tilde{D}_\Sigma)$ or equivalently $$\tilde{D}_\Sigma = \{\tilde{D}^\delta; \delta = \{1, \ldots, \delta_{max}\}\} \xrightarrow{f_{mod}} \tilde{S}_\Sigma = \{\tilde{S}^\delta; \delta = \{1, \ldots, \delta_{max}\}\}$$

When utilizing the detection (symbol or sequence detection) according to the invention, a priori known information is exploited. The detection process basically involves the received signal $R_i$ and the a priori known information $\tilde{D}_\Sigma$ and generates a set of decoded data packets according to $$\tilde{D} = \{\tilde{D}^\Delta; \Delta = \{1, \ldots, \Delta_{max}\}\}$$

Hence with an objective function there is an optimum mapping from $R_i$ and $\tilde{D}_\Sigma$ to $\tilde{D} = \{\tilde{D}^\Delta; \Delta = \{1, \ldots, \Delta_{max}\}\}$ which we write in its most generic form $$\tilde{D} = f(R_i, \tilde{D}_\Sigma)$$

It will be clear in the following that various methods may be used to perform the decoding, but for concept 1 we will mainly focus on the case where the detection process is dived in two steps: first interference of a priori known information is removed or cancelled and then conventional MUD/SUD (multi-user detection or single-user detection) is performed.

The stored data is subsequently updated by incorporating the newly decoded data through $\tilde{D}_\Sigma(n+1) = \tilde{D}_\Sigma(n) \cup \tilde{D}(n)$ where the time is explicitly indicated.

Exemplary Method 1—Unknown Transmitted Packets and Unknown Channels

Here we assume that the complex channels are unknown. It is also unknown which (of the previously decoded) packets that are sent.

A residual signal is generated through a function $f_1$ and a set of weight parameters $\tilde{A}$ derived under an optimization condition represented by the objective function $f_{1opt}$ where the influence of previously decoded packets is minimized from the residual signal. In its most general form, this can be written $$R'_i = f_1(R_i, \tilde{D}_\Sigma, \tilde{A})$$

where $$\tilde{A} = \arg \left\{ \underset{A = \{a^\delta; \forall \delta\}}{\text{opt}} \{f_1(R_i, \tilde{D}_\Sigma, A)\} \right\}$$

A particular case of the functions $f_1$ is $$R'_i = R_i - \sum_{\forall \delta} a^\delta \tilde{S}^\delta$$

for all indices.

The objective function $f_{1opt}$ may be defined as the (minimization of the) expectation value of the variance of $R'_i$. In other terms:

$$f_{1opt}(x) = E\{|x|^2\}$$

or $$\tilde{A} = \arg \left\{ \underset{A = \{a^\delta; \forall \delta\}}{\min} E\{|R'_i|^2\} \right\}$$

The solution to this is relatively straightforward as each element in $\tilde{A}$ may be written $$a^\delta = \frac{E\{R_i \cdot \tilde{D}^{\delta*}\}}{E\{R_i \cdot R^*_i\}}$$

It is noted that this is identical to an estimate of the product of the channel $\tilde{H}_{ji}$ and the transmit amplitude $\sqrt{\tilde{P}_j}$ from a node $v_j$ that transmitted the data message $\tilde{D}^\delta$. If the data message $\tilde{D}^\delta$ was not transmitted, the term $a^\delta$ should be approximately zero. Note that a salient assumption in the above is that the data messages are assumed uncorrelated, which they generally are, and may be statistically guaranteed through scrambling.

Exemplary Method 2—Unknown Transmitted Packets, but Known Channels

In the case that the channels are known, for example through channel estimation based on pilots, another strategy can be used to estimate the residual signal. In its most general form this can be formulated through a function $f_2$ and an objective optimization function $f_{2opt}$ as $$R'_i = f_2(R_i, \tilde{D}'_\Sigma, \tilde{H}_i)$$

where $$\tilde{D}'_\Sigma = \arg \left\{ \underset{PS_{jmax}(\tilde{D}_\Sigma)}{\text{opt}} \{f_{2opt}(R_i, PS_{jmax}((\tilde{D})_\Sigma), \tilde{H}_{ij})\} \right\}$$

and $PS_{jmax}(\tilde{D}_\Sigma)$ is the power set of subsets of cardinality $j_{max}$ of the set $\tilde{D}_\Sigma$.

A particular case of the function $f_2$ is the direct subtraction of the determined previously decoded sequences.

$$R'_i = R_i - \sum_{\forall (\tilde{D}')_\Sigma} H^\delta_{ij} \sqrt{P^\delta_j} \tilde{S}^\delta$$

and $f_{2opt}$ is the (minimization) of the squared sum of the residual signal (with samples indexed by k)

$$f_{2opt}(x) = \sum_{\forall k} |x(t_k)|^2$$

or more explicitly $$\tilde{D}'_{\Sigma} = \arg\left\{\min_{PS_{j_{\max}}(\tilde{D}_{\Sigma})}\left\{\sum_{\forall k}|R'_i(t_k)|^2\right\}\right\}.$$

Additional Aspects

Further information such as transmission schedule, and information on where packets currently reside may also be exploited to improve and potentially simplify the interference cancellation procedure. This means that if one knows the exact transmission schedule as in a circuit switched multi-hop network, and hence that some packets are not transmitted in certain timeslots, then those packets do not have to be considered even if they have been received previously. In addition, it may be possible to have some a priori knowledge (at least an estimate) of average path loss. The use of a transmission schedule is also indicated in the previously described flow diagrams of FIGS. 2 and 3.

For channel identification, standard channel estimation techniques may be used, e.g. estimation based on pilots (a.k.a. training symbols), but also blind channel estimation may be deployed exploiting structure in modulation or similar.

Exemplary Concept 2

In the second concept of the invention, it is suggested to employ a joint processing procedure based on a priori known information in the form of previously received signal information together with the currently received signal information. The received signal information is typically in the form of baseband signals, each of which generally includes a superposition of multiple transmissions. Although the received baseband signal information will mainly be exemplified as related to a number of time slots, it should be understood that more generally the received information may be related to communication instances since the frequency may vary from communication instance to instance.

An example of a feasible implementation will be described with reference to a multi-hop network. It may however be useful to begin with an exemplary reception model of multiple transmissions in a multi-hop network.

It is assumed that transmissions take place in time slots and that frequency flat channels are considered (e.g. through narrowband signals or subcarrier-wise in OFDM). First, it is assumed that all data packets are time continuous sequences and indexed by d that uniquely identifies the packet in the network. In the following, the time index is suppressed from notation for brevity. At timeslot n, a packet $D^d$ may or may not be transmitted. The node(s) from which it is transmitted is identified by index j and the node receiving the packet is identified by index i. In this case, if packet $D^d$ is transmitted, its corresponding modulated signal is multiplied with a factor $\chi_i^{(d)}(n)$ which incorporates among other things the complex (quasi stationary) channel gain $H_{ij}(n)$ between node i and node j, else it is zero in absence of any transmission. The factor $\chi_i^{(d)}(n)$ also assumes a zero value when node i is not receiving, e.g. due to being in sleep mode or transmitting. The data packet $D^d$ is modulated into a sequence $S^{(d)}(n, i, j, cnt_{ret}, cnt_{tot})$ that may possibly change from each time it is transmitted, due to a set of factors such as identity of packet $D^d$, which node (j) that is transmitting, to which node (i) is the packet sent, in which time slot (n) is the packet sent, possibly also as a function of a retransmit counter $cnt_{ret}$ (per packet and node) or depending on the total number of times that it has been transmitted $cnt_{tot}$. An example here is if receiver-oriented spreading codes would be used. However, in the following we assume that the signal waveform for data packet $D^d$ remains the same all the time apart from a complex multiplication sequence denoted $C(n,d,i,j,cnt_{ret},cnt_{tot})$ such that:

$$S^{(d)}(n,i,j,cnt_{ret},cnt_{tot})=C(n,d,i,j,cnt_{ret},cnt_{tot})\cdot S^{(d)}.$$

This multiplicative sequence can be used to incorporate frequency hopping, DS-CDMA spreading, a complex constant that changes with n, or just a simple fixed value of one. For instance, the complex constant change can be used to create a sort of simple linear time-space coding if packets are retransmitted from the same station. Note that in the most general case, the same packet can be transmitted by multiple stations in the same timeslot. This is not directly common in traditional multi-hop routing schemes for unicast routing, although indeed possible as exemplified in [8], but is certainly common for flooded broadcast or multicast traffic. In DARPA's (Defense Advanced Research projects Agency) PRnet, routing of multiple versions of a packet could occur in certain cases. The received signal at time slot n for node i is summed for all possible packets up to the packet $d_{max}$ according to:

$$R_i(n) = \sum_{d=1}^{d_{\max}} \chi_i^{(d)}(n) \cdot S^{(d)} + N_i(n)$$

where $$\chi_i^{(d)}(n) = \begin{cases} \sum_j C(n, d, i, j, cnt_{ret}, cnt_{tot}) \cdot H_{ij}(n), & \text{if } d \text{ is transmitted from node } j \\ 0, & \text{if } d \text{ is not transmitted or node } i \text{ is not receiving} \end{cases}$$

This may then be written as a system of equations in matrix form for timeslot n-m to timeslot n as $$\begin{bmatrix} R_i(n) \\ R_i(n-1) \\ \vdots \\ R_i(n-m) \end{bmatrix} = \begin{bmatrix} \chi_i^{(1)}(n) & \chi_i^{(2)}(n) & \cdots & \chi_i^{(d_{\max})}(n) \\ \chi_i^{(1)}(n-1) & \chi_i^{(2)}(n-1) & \cdots & \chi_i^{(d_{\max})}(n-1) \\ \vdots & \vdots & \vdots & \vdots \\ \chi_i^{(1)}(n-m) & \chi_i^{(2)}(n-m) & \cdots & \chi_i^{(d_{\max})}(n-m) \end{bmatrix}$$

$$\begin{bmatrix} S^{(1)} \\ S^{(2)} \\ \vdots \\ S^{(d_{\max})} \end{bmatrix} + \begin{bmatrix} N_i(n) \\ N_i(n-1) \\ \vdots \\ N_i(n-m) \end{bmatrix}$$

or equivalently $$\overline{R}_i = X_i \cdot \overline{S} + \overline{N}_i$$

where the bar indicates a vector and the absence of a bar indicates a matrix. Although not observable for a single node i, all transmissions for the whole multi-hop system, i.e. the reception vectors for all V nodes, can be written as:

$$\begin{bmatrix} \overline{R}_1 \\ \overline{R}_2 \\ \vdots \\ \overline{R}_V \end{bmatrix} = \begin{bmatrix} X_1 \\ X_2 \\ \vdots \\ X_V \end{bmatrix} \cdot \overline{S} + \begin{bmatrix} \overline{N}_1 \\ \overline{N}_2 \\ \vdots \\ \overline{N}_V \end{bmatrix}$$

or in a simpler matrix form $$\overline{R} = \Xi \cdot \overline{S} + \overline{N}$$

We reiterate the basic message here that this system of equations described above (for node i and for the whole system) are data-packet-oriented formulations indicating that a given data packet may cause interference many times and over different hops. Hence, collating and exploiting this more complete picture of information allows for an enhanced detection process relative traditional detection/decoding.

Figure 14:
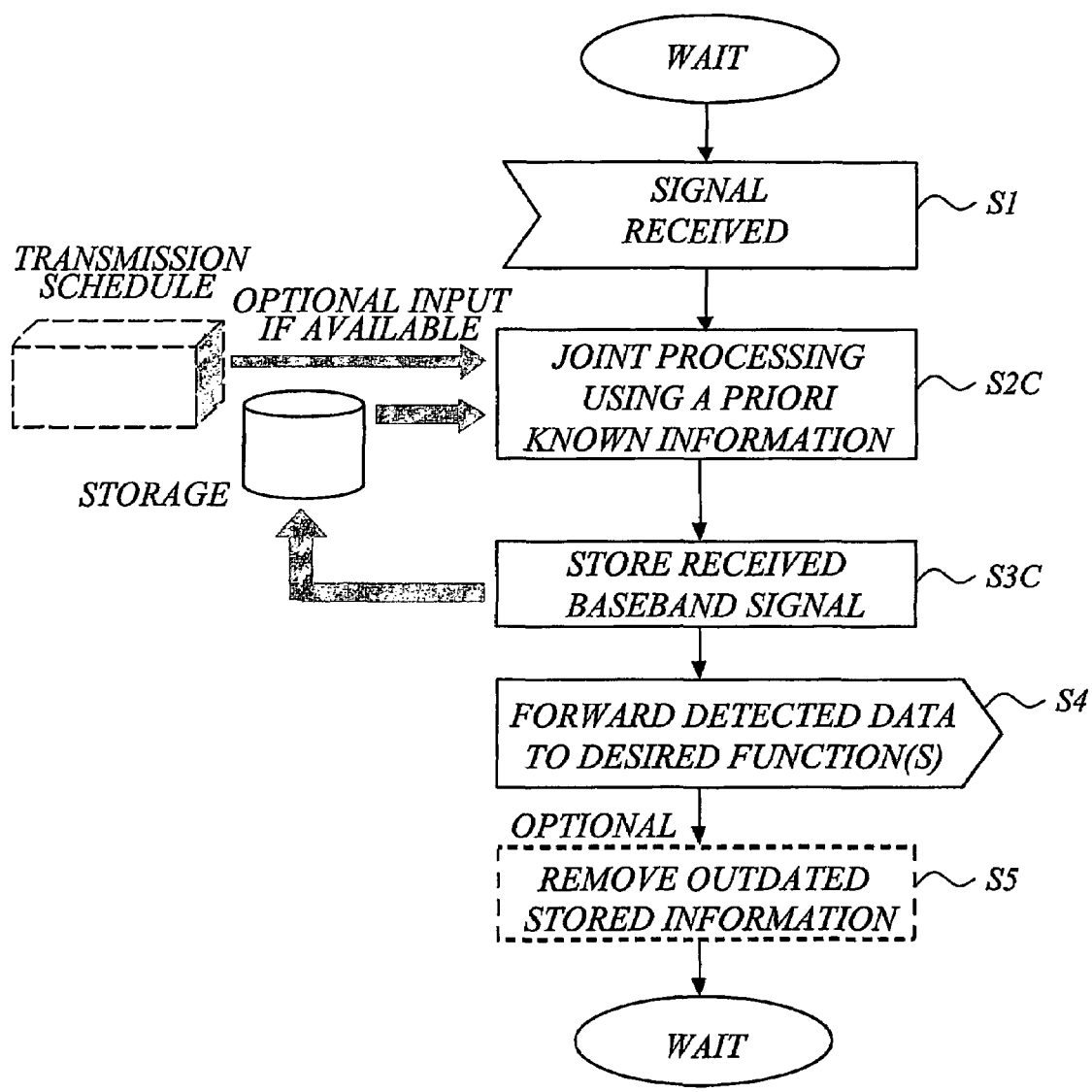
FIG. 14 is a schematic flow diagram illustrating the basic principles of the invention, based specifically on a joint processing procedure, according to a preferred embodiment of the invention.

In the exemplary second concept of the invention, the detection module in node i jointly processes $\overline{R}_i = X_i \cdot \overline{S} + \overline{N}_i$ (including the latest received signal) to decode data being of interest. Any general detection algorithm, such as Zero Forcing (ZF), Maximum Likelihood Detection—Multi-User Detection (MLD—MUD) and Linear Minimum Mean Squared Error (LMMSE), may be used by the invention to find the modulated sequences $\overline{S}$. From a pure signal processing point of view, this is similar to processing multi-sensor information, such as in space-time coded communication based systems (such as MIMO) and may therefore employ detection or decoding strategies found in some instances in that field. Note that in the flow diagram of FIG. 14, information is detected by means of joint processing, as indicated in step S2C. Also, the storage buffer for a priori known information typically maintains previously received baseband signal information, as indicated in step S3C. It can also be seen from FIG. 14, that either single user detection or the more general case of multi-user detection may be employed.

Exemplary Hybrid of Concept 1 and 2

Figure 15:
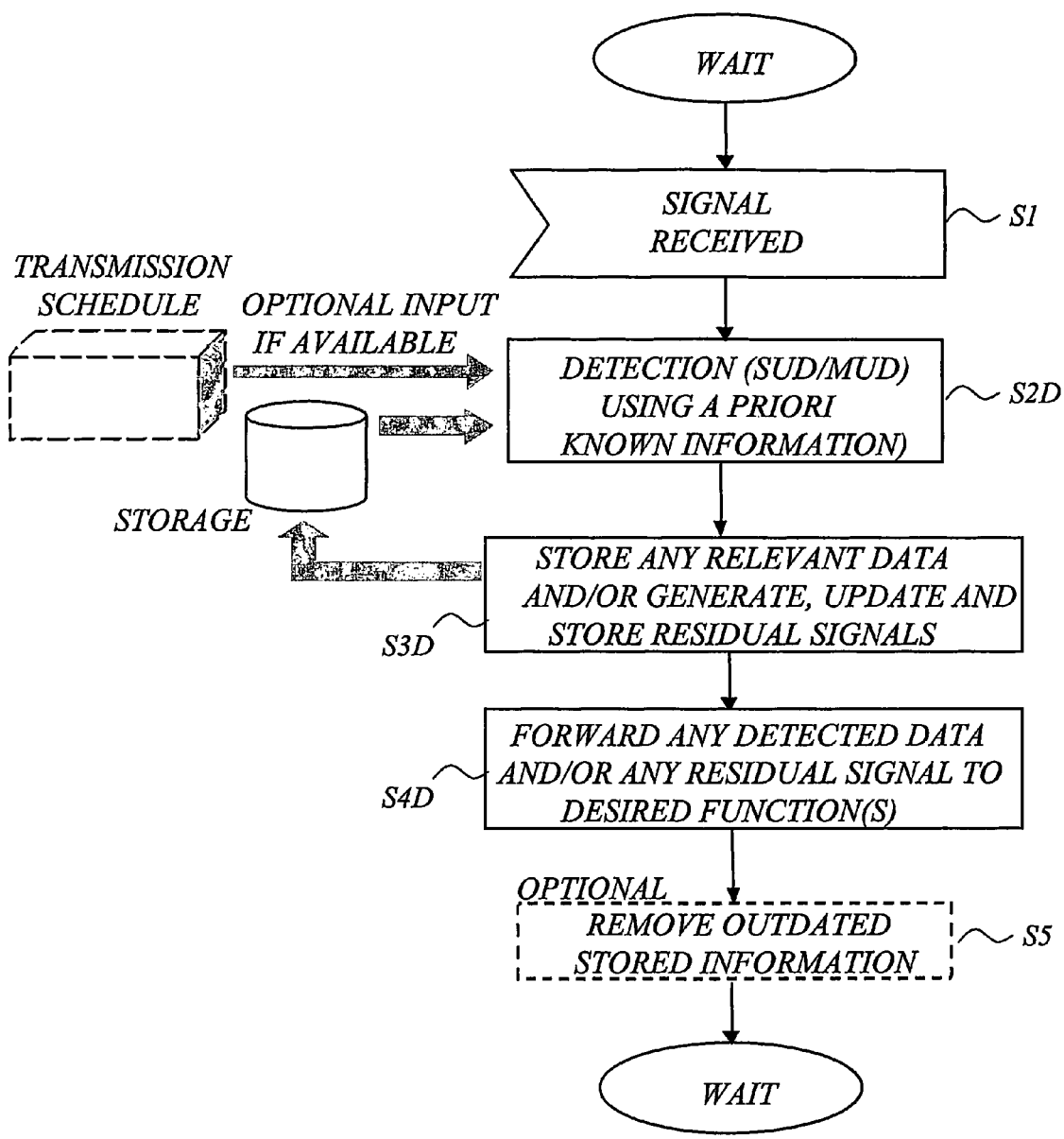
FIG. 15 is a schematic flow diagram illustrating the basic principles of a hybrid of explicit interference cancellation with residual decoding and storing residual baseband signals as a priori known information according to a preferred embodiment of the invention.

In this alternative embodiment, which is schematically illustrated in FIG. 15, concept 1 and 2 are combined in the sense that as in concept 2 all information is retained, but as in concept 1 the information is decoded to the greatest extent and a suitable representation thereof is stored. The benefit in doing this is that the decoding complexity is decreased (as compared to concept 2) while information is retained in the residual signals being stored. FIG. 15 illustrates an example of the hybrid concept exploiting a priori known data and a priori known residual baseband signals.

Supplementary Information

Comment on the Degree of a Priori Known Information

Depending on employed routing scheme, a minor part of for instance the header and/or CRC may or may not be link dependent. For example, if the routing scheme requires that packets use forwarding nodes the sender and receiver IDs will differ from hop-to-hop. The route and hence the IDs may however be predetermined or not needed at all (e.g. in case a table driven protocol is used only a flow ID is necessary). Hence, there is possibly up to 5% of the overall data (confined in the header or a trailer) that may not be a priori known. For the 5% case, good coding in conjunction with some interleaver design will cater for the handling of a few errors. Yet, it should be emphasized that in a circuit switched based multi-hop network, fields do not have to be changed for each hop and therefore allow 100% interference cancellation. In many cases, as the paths are a priori known, it is possible to judge how various fields, such as IDs and CRC should look like as known information is forwarded. Moreover, when paths are not a priori known, each node may still calculate a number of versions of a previously correctly decoded packet under the assumption that it is sent between any node pair within its own vicinity, and subsequently using the most optimum one in the process of canceling interference. In this case, 100% of interference may also be cancelled, provided the correct version is used.

Also note that for packet switched data (with changing fields), a separate non-colliding control channel may also be used to send information that is related to a packet and may change as the packet is routed. For instance, address fields and CRCs may be sent on such a control channel. Note that this generally includes a small amount of information relative to the data and therefore does not necessarily consume much energy in a relative sense. Therefore, the utilization of the collision free protocol is not as important from an efficiency point of view as for the data transmissions.

Briefly, a first aspect of the invention concerns a communication system comprising at least one receiving station and at least one transmitting station, wherein the receiving station stores its previously transmitted data, decoded data from own reception, and/or decoded data from any overheard communication. Stored data is exploited at subsequent receptions to cancel interference caused if any of the stored data is transmitted by at least one other station. This is the basic idea of canceling previously decoded data.

Preferably, stored data is removed when outdated. This may be timer-based, or controlled by indication from the destination node or indication that data is far away not to cause significant interference.

In particular, at least one data unit may be decoded from a received signal, being comprised of a superposition of multiple transmissions, utilizing given a priori known and stored data.

The stored a priori known signal information may for example include own transmitted (also forwarded) information, previously received and detected information, even previously overheard information.

The invention thus adds a new dimension to the channel access problem, through the novel mechanism of storing and exploiting a priori known information. The invention clearly enhances network performance and effectively solves the classical hidden terminal problem.

As previously mentioned, detection can be done per bit or symbol or per sequence of bits or symbols, for a single user or for multiple users. The detection may take place on coded information or on information bits.

As already indicated, the invention is generally applicable to wireless relaying networks such as multi-hop networks, cooperative relaying networks and repeater-based networks.

In an exemplary embodiment, the wireless relaying communication system comprises at least two "bi-directionally" communicating nodes or stations and at least one relaying node or station, wherein the at least two bi-directionally communicating stations transmit concurrently in a first phase or sequentially in two phases to the at least one relaying station. In a further phase, the relaying station or stations retransmit the received signals concurrently to the at least two bi-directionally communicating stations (now receiving). Each bi-directionally communicating station is configured for detecting signal information from the other communicating node by interference cancellation based on the concurrently transmitted signal information from the intermediate relay node and its own transmitted signal information.

Preferably, the received signals are processed prior to retransmission by the relays, and the processing advantageously ensures SNR enhancement and/or diversity combining at the receiving nodes.

Yet another exemplary embodiment of the invention concerns a communication system comprising a station transmitting and receiving data (after each other), a station receiving data and a station transmitting data and a multitude of stations acting as relays, wherein the station transmitting and receiving data cancels the influence of its own transmitted data. This relates for example to the cooperative relaying case with concurrent uplink and downlink communication, but can also be used for multi-hopping.

It should be understood that many different types of interference cancellation, including both explicit and implicit interference cancellation techniques, can be used by the invention.

In a second aspect of the invention, signal information may be detected by jointly processing a priori known information in the form of previously received baseband signal information together with currently received baseband signal information. This means that the receiving station utilizes any previously received baseband information in the process of decoding the most recently received baseband signal.

It should be noted that the first and second aspects may be combined into a hybrid concept, including storage of both baseband and decoded data.

Briefly put, the invention provides improvements in reception, for example thanks to "removal" of previously known information, detected (demodulated and/or decoded) or in baseband form, irrespective of network, multi-hop, cooperative relaying or repeater-based network.

Exemplary Advantages of the Invention:
  Inherently enhances throughput, end-to-end delay, communication robustness and any combination thereof, as a priori known information does not cause any interference.
  An interesting case to point out is that the proposed invention alleviates much, if not most, of the classical "hidden terminal problem". This falls under the previous point, but is in itself worth pointing out.

Although the invention mainly has been described under the implicit assumption of omni-directional antennas, it is also feasible to use for example antenna-array-oriented channel access schemes such as SDMA (Spatial Diversity Multiple Access). Further, the invention may be used with various advanced antenna schemes, like beamforming or MIMO.

The embodiments described above are merely given as examples, and it should be understood that the present invention is not limited thereto. Further modifications, changes and improvements which retain the basic underlying principles disclosed and claimed herein are within the scope of the invention.

APPENDIX A

Some Channel Capacity Calculations for Concept 1

In determining the curves of FIG. 9, the following mathematical relations have been used:

The one hop SNR is defined as $$SNR = \frac{P \cdot G}{N}$$

where P is the transmit power, G is the one hop path gain and N is the noise power at the receiver.

Given a power law path-loss model with propagation exponent $\alpha$, and assuming that $S_5$ that the path loss is lowered and exploited over two equidistant hops, the SNR at node C is:

$$SNR' = SNR \cdot 2^\alpha$$

Three basic types of transmissions are of interest first. First, a single transmission has a rate of:

$$R_1 = 1 \ g_2(1 + SNR')$$

MUD reception can be shown for an equal rate case to give a maximum rate $R_2$ from each transmitter of:

$$2R_2 = 1 \ g_2(1 + 2 \cdot SNR')$$

Transmitting two super-positioned signals, where the a priori known signals is cancelled, gives a rate $R_3$ for each individual message (with half the power) according to:

$$R_3 = 1 \ g_2(1 + SNR'/2)$$

Given this, and considering both transmissions and the number of slots used for the cycle, the maximum throughput for scheme a) to d) in FIG. 8 are given by:

$$T_a = \frac{2}{2} \min(R_2, R_3)$$

$$T_b = \frac{2}{3} \min(R_1, R_3)$$

$$T_c = \frac{2}{3} \min(R_2, R_1)$$

$$T_d = \frac{2}{4} R_1$$

In determining the throughput for scheme e) in FIG. 9, the received signals and noise are normalized to transmit power P prior to transmission. The resulting SNR at both node A and B, after interference cancellation, can be shown to be:

$$SNR_{Analog} = \frac{(SNR')^2}{1 + 3 \cdot SNR'}$$

The rate for each information flow is $R_{Analog} = 1 \ g_2(1 + SNR_{Analog})$ and hence, the throughput is $$T_{Analog} = \frac{2}{2} R_{Analog}.$$

REFERENCES

[1]. R. Nelson and L. Kleinrock. "Spatial-TDMA: A collision free multi-hop channel access protocol", in IEEE Trans. Commun. vol. 33, no. 9, pp 934-944, September 1985.

[2]. A. S. Tanenbaum, "Computer Networks", Prentice Hall, 1996, pp. 246-254.

[3]. Bertsekas et al., "Data Networks", Prentice Hall, 1991, pp. 350-351.

[4]. P. Karn "MACA—A new channel access method for packet radio", Proc. ARRL/CRRL Amateur Radio $9^{th}$ Computer Networking Conference, pp. 134-140, London, UK, September 1990.

[5]. V. Bhargawan et al."MACAW: A media access protocol for wireless LAN's" in Proc. ACM SIGCOMM'94, pp. 212-225, London, UK, August-September 1994.

[6]. F. A. Tobagi et al, "Packet switching in radio channels: part ii—hidden terminal problem in carrier sense multiple access modes and busy-tone solution" IEEE trans. Commun., vol. 23, no. 12, pp. 1417-1433, December 1975.

[7]. S. Brooke and T. Giles. "Scheduling and performance of multi-hop radio networks with multi user detection", in Proc. Second Swedish Workshop on Wireless Ad-Hoc Networks, Stockholm, March 2002.

[8]. M. Steenstrup and G. S. Lauer, "Routing in communications networks", Prentice Hall, 1995, pp. 357-396.

[9]. A. El Gamal, "Multiple user information theory", Proc. Of the IEEE, Vol. 68, December 1980.

[10]. P. Larsson, "Large-Scale Cooperative Relaying Network with Optimal Coherent Combining under Aggregate Relay Power Constraints", December 2003.

The invention claimed is:

1. A method for detecting signal information in a wireless relaying network, said method comprising the steps of:
a first network node storing, as a priori known signal information, previously received signal information representative of a first set of information including at least one data unit to be transmitted in total more than one time over at least one link;
said first network node subsequently receiving signal information representative of a second set of information, wherein a transmission of said at least one data unit by a second network node interferes with the reception of said second set of information; and
said first network node detecting at least part of said second set of information by interference cancellation based on the received signal information representative of said second set of information and at least part of said previously stored a priori known signal information,
wherein said step of said first network node detecting at least part of said second set of information includes the step of processing a set $\tilde{D}_\Sigma$ representative of previously detected data packets and the received signal information $R_i$ according to:

$$\tilde{D} = f(R_i, \tilde{D}_\Sigma),$$

where $f$ is a predetermined objective function and $\tilde{D}$ is the resulting set of detected data packets.

2. The method for detecting signal information in a wireless relaying network according to claim 1, wherein said interference cancellation includes at least one of explicit and implicit interference cancellation.

3. The method for detecting signal information in a wireless relaying network according to claim 1, wherein said at least one data unit is to be transmitted in total more than one time over more than one link.

4. The method for detecting signal information in a wireless relaying network according to claim 1, wherein said wireless relaying network includes at least one of a wireless multi-hop network, a cooperative relaying network and a repeater-based network.

5. The method for detecting signal information in a wireless relaying network according to claim 1, wherein said wireless relaying network is a wireless multi-hop network.

6. The method for detecting signal information in a wireless relaying network according to claim 1, wherein said detecting step involves one of single-user detection and multi-user detection.

7. The method for detecting signal information in a wireless relaying network according to claim 1, wherein said step of said first network node detecting at least part of said second set of information comprises the steps of:
removing a priori known signal information from the received signal information to generate a residual signal; and
processing said residual signal to detect at least part of said second set of information.

8. The method for detecting signal information in a wireless relaying network according to claim 1, wherein said a priori known signal information includes previously received baseband signal information, and said step of said first network node detecting at least part of said second set of information comprises the step of jointly processing said previously received baseband signal information and subsequently received baseband signal information to detect at least part of said second set of information.

9. The method for detecting signal information in a wireless relaying network according to claim 8, wherein said previously received baseband signal information relate to a number of previous communication instances and the subsequently received baseband signal information relates to the current communication instance, and said previously received baseband signal information and said subsequently received baseband signal information are processed together with complex channel gain information to determine an estimation of at least one detected data packet.

10. The method for detecting signal information in a wireless relaying network according to claim 1, wherein said a priori known signal information includes previously received and detected information.

11. The method for detecting signal information in a wireless relaying network according to claim 10, wherein said previously received and detected information includes previously overheard information.

12. The method for detecting signal information in a wireless relaying network according to claim 1, wherein said step of said first network node detecting at least part of said second set of information is based on transmission schedule information.

13. The method for detecting signal information in a wireless relaying network according to claim 12, wherein said first set of information includes a number of data packets, and said transmission schedule information includes information on which of the data packets that are to be transmitted when the signal information representative of said second set of information is received such that an appropriate part of said previously stored a priori known signal information is exploited in said detecting step.

14. The method for detecting signal information in a wireless relaying network according to claim 1, further comprising the step of continuously updating said a priori known signal information.

15. An arrangement for detecting signal information in a wireless relaying network, said arrangement comprising:
   means arranged in a first network node for storing, as a priori known signal information, previously received signal information representative of a first set of information, including at least one data unit to be transmitted more than one time over at least one link;
   means arranged in said first network node for receiving signal information representative of a second set of information, wherein a transmission of said at least one data unit by a second network node interferes with the reception of said second set of information; and
   means arranged in said first network node for detecting at least part of said second set of information by interference cancellation based on the received signal information representative of said second set of information and at least part of said previously stored a priori known signal information,
   wherein said means for detecting at least part of said second set of information includes means for processing a set $\tilde{D}_\Sigma$ representative of previously detected data packets and the received signal information $R_i$ according to:

$$\tilde{D} = f(R_i, \tilde{D}_\Sigma),$$

where θ is a predetermined objective function and $\tilde{D}$ is the resulting set of detected data packets.

16. The arrangement for detecting signal information in a wireless relaying network according to claim 15, wherein said interference cancellation includes at least one of explicit and implicit interference cancellation.

17. The arrangement for detecting signal information in a wireless relaying network according to claim 15, wherein said at least one data unit is to be transmitted in total more than one time over more than one link.

18. The arrangement for detecting signal information in a wireless relaying network according to claim 15, wherein said wireless relaying network includes at least one of a wireless multi-hop network, a cooperative relaying network and a repeater-based network.

19. The arrangement for detecting signal information in a wireless relaying network according to claim 15, wherein said wireless relaying network is a wireless multi-hop network.

20. The arrangement for detecting signal information in a wireless relaying network according to claim 15, wherein said means for detecting is operable for performing at least one of single-user detection and multi-user detection.

21. The arrangement for detecting signal information in a wireless relaying network according to claim 15, wherein said means for detecting at least part of said second set of information comprises:
   means for removing a priori known signal information from the received signal information to generate a residual signal; and
   means for processing said residual signal to detect at least part of said second set of information.

22. The arrangement for detecting signal information in a wireless relaying network according to claim 15, wherein said a priori known signal information includes previously received baseband signal information, and said means for detecting at least part of said second set of information comprises means for jointly processing said previously received baseband signal information and the subsequently received baseband signal information to detect at least part of said second set of information.

23. The arrangement for detecting signal information in a wireless relaying network according to claim 22, wherein said previously received baseband signal information relate to a number of previous communication instances and the subsequently received baseband signal information relates to the current communication instance, and said means for jointly processing is operable for processing said previously received baseband signal information and said subsequently received baseband signal information together with complex channel gain information to determine an estimation of at least one detected data packet.

24. The arrangement for detecting signal information in a wireless relaying network according to claim 15, wherein said a priori known signal information includes previously received and detected information.

25. The arrangement for detecting signal information in a wireless relaying network according to claim 24, wherein said previously received and detected information includes previously overheard information.

26. The arrangement for detecting signal information in a wireless relaying network according to claim 15, wherein said means for detecting at least part of said second set of information operates based on transmission schedule information.

27. The arrangement for detecting signal information in a wireless relaying network according to claim 26, wherein said first set of information includes a number of data packets, and said transmission schedule information includes information on which of the data packets that are to be transmitted when the signal information representative of said second set of information is received, and said means for detecting comprises means for selecting, based on said transmission schedule information, an appropriate part of said previously stored a priori known signal information for use in detecting at least part of said second set of information.

28. The arrangement for detecting signal information in a wireless relaying network according to claim 15, further comprising means for continuously updating said a priori known signal information by incorporating newly detected information and removing outdated signal information.

29. The arrangement for detecting signal information in a wireless relaying network according to claim 15, wherein said arrangement is implemented in a network node of said wireless relaying network.

30. Apparatus for detecting signal information in a wireless relaying network, comprising:
   memory arranged in a first network node for storing, as known signal information, previously received signal information representative of a first set of information including at least one data unit to be transmitted more than one time over a link;
   a receiver arranged in the first network node for receiving signal information representative of a second set of information, wherein a transmission of the one data unit by a second network node interferes with the reception of the second set of information; and
   a detector arranged in the first network node for detecting at least part of the second set of information by interference cancellation based on the received signal information representative of the second set of information and at least part of the stored known signal information, wherein the detector includes a data processor for processing a set $\tilde{D}_\Sigma$ representative of previously detected data packets and the received signal information $R_i$ according to:

$$\tilde{D}=f(R_i,\tilde{D}_\Sigma),$$

where $f$ is a predetermined objective function and $\tilde{D}$ is the resulting set of detected data packets.

31. The apparatus according to claim 30, wherein the detector is operable for performing at least one of single-user detection and multi-user detection.

32. The apparatus according to claim 30, wherein the detector comprises processing circuitry for:
 removing a priori known signal information from the received signal information to generate a residual signal; and
 processing the residual signal to detect at least part of the second set of information.

33. The apparatus according to claim 30, wherein said known signal information includes previously received baseband signal information, and the detector is configured to jointly process previously received baseband signal information and subsequently received baseband signal information to detect at least part of the second set of information.

34. The apparatus according to claim 33, wherein the previously received baseband signal information relate to a number of previous communication instances and the subsequently received baseband signal information relates to the current communication instance, and the detector is configured to process the previously received baseband signal information and the subsequently received baseband signal information together with complex channel gain information to determine an estimation of at least one detected data packet.

35. The apparatus according to claim 30 implemented in a network node of the wireless relaying network.

* * * * *

UNITED STATES PATENT AND TRADEMARK OFFICE
CERTIFICATE OF CORRECTION

PATENT NO.        : 7,336,930 B2
APPLICATION NO.   : 10/549908
DATED             : February 26, 2008
INVENTOR(S)       : Larsson et al.

It is certified that error appears in the above-identified patent and that said Letters Patent is hereby corrected as shown below:

On the Title Page, in Field (56), under "OTHER PUBLICATIONS", in Column 2, Line 1, delete "ad hac" and insert -- ad hoc --, therefor.

On the Title Page, in Field (57), under "ABSTRACT", in Column 2, Line 16, after "parts of" delete "the".

In Column 9, Line 29, delete "T1" and insert -- $T_1$ --, therefor.

In Column 10, Line 11, delete "S1" and insert -- $S_1$ --, therefor for each occurrence in the paragraph.

In Column 10, Line 12, delete "S2" and insert -- $S_2$ --, therefor for each occurrence in the paragraph.

In Column 12, Line 55, delete " $S^{jd}$ " and insert -- $S_j^d$ --, therefor.

In Column 13, Line 19, after "and" delete "the".

In Column 13, Line 50, delete " $R'_i = f_1(R_i, \tilde{D}_\Sigma, \tilde{A})$ " and insert -- $R'_i = f_1(R_i, \tilde{D}_\Sigma, \tilde{A})$ --, therefor.

In Column 14, Line 5, delete " $f_{1opt}(x) = E\{|xx|^2\}$ " and insert -- $f_{1opt}(x) = E\{|x|^2\}$ --, therefor.

In Column 14, Line 38, delete " $R'_i = f_2(R_i, \tilde{D}'_\Sigma, \tilde{H}_i)$ " and insert -- $R'_i = f_2(R_i, \tilde{D}'_\Sigma, \tilde{H}_i)$ --, therefor.

UNITED STATES PATENT AND TRADEMARK OFFICE
CERTIFICATE OF CORRECTION

PATENT NO. : 7,336,930 B2
APPLICATION NO. : 10/549908
DATED : February 26, 2008
INVENTOR(S) : Larsson et al.

It is certified that error appears in the above-identified patent and that said Letters Patent is hereby corrected as shown below:

In Column 23, Line 30, in Claim 15, delete "$\theta$" and insert -- $f$ --, therefor.

Signed and Sealed this

Eleventh Day of November, 2008

JON W. DUDAS
*Director of the United States Patent and Trademark Office*